US011235553B2

(12) United States Patent
Kawazu et al.

(10) Patent No.: US 11,235,553 B2
(45) Date of Patent: Feb. 1, 2022

(54) FOAM MOLDED PRODUCT AND METHOD OF PRODUCING SAME

(71) Applicant: ASAHI KASEI KABUSHIKI KAISHA, Tokyo (JP)

(72) Inventors: Yasuyuki Kawazu, Tokyo (JP); Tetsuo Nakamoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/968,160

(22) PCT Filed: Apr. 5, 2019

(86) PCT No.: PCT/JP2019/015160
§ 371 (c)(1),
(2) Date: Aug. 7, 2020

(87) PCT Pub. No.: WO2019/198642
PCT Pub. Date: Oct. 17, 2019

(65) Prior Publication Data
US 2021/0039352 A1    Feb. 11, 2021

(30) Foreign Application Priority Data

Apr. 9, 2018  (JP) .............................. JP2018-074951
May 31, 2018  (JP) .............................. JP2018-105123

(51) Int. Cl.
*B32B 5/32*       (2006.01)
*B32B 5/20*       (2006.01)
(Continued)

(52) U.S. Cl.
CPC ................ *B32B 5/32* (2013.01); *B29C 44/06* (2013.01); *B29C 44/54* (2013.01); *B29C 44/56* (2013.01);
(Continued)

(58) Field of Classification Search
CPC .. B32B 5/32; B32B 5/20; B32B 27/34; B32B 2307/732; B32B 2605/00; B29C 44/06;
(Continued)

(56) References Cited

U.S. PATENT DOCUMENTS 10,272,652 B2   4/2019  Skaggs et al.
2008/0185874 A1*  8/2008  Kimoto .................. B32B 27/04
                                                    296/203.01
(Continued)

FOREIGN PATENT DOCUMENTS

CN       102985507 A    3/2013
CN       103408823 A   11/2013
(Continued)

OTHER PUBLICATIONS

Espacenet Translation of JP2014208418A (Year: 2021).*
(Continued)

*Primary Examiner* — Michael Zhang
(74) *Attorney, Agent, or Firm* — Kenja IP Law PC

(57) ABSTRACT

Provided are a foam molded product and a method of producing the same. The foam molded product is a molded product containing a resin and including a surface layer, a compressive deformation layer, and a foam layer. The thickness of the surface layer is 0.1 mm to 5.0 mm. The compressive deformation layer is located between the surface layer and the foam layer. Foam particles forming the compressive deformation layer have an average H/L of 0.5 or less (H: length in compression direction; L: length in perpendicular direction relative to compression direction). Foam particles forming the foam layer have an expansion ratio of not less than 3.0 times and less than 30 times.

6 Claims, 4 Drawing Sheets

(51) Int. Cl.
  *B32B 27/34* (2006.01)
  *B29C 44/06* (2006.01)
  *B29C 44/54* (2006.01)
  *B29C 44/56* (2006.01)
  *B60R 13/08* (2006.01)
  *F02B 77/11* (2006.01)
  *B29K 77/00* (2006.01)
  *B29K 105/04* (2006.01)
  *B29L 31/30* (2006.01)

(52) U.S. Cl.
  CPC ............ *B32B 5/20* (2013.01); *B32B 27/34* (2013.01); *B60R 13/0838* (2013.01); *F02B 77/11* (2013.01); *B29K 2077/00* (2013.01); *B29K 2105/048* (2013.01); *B29K 2995/0015* (2013.01); *B29L 2031/30* (2013.01); *B32B 2250/03* (2013.01); *B32B 2250/22* (2013.01); *B32B 2250/24* (2013.01); *B32B 2307/304* (2013.01); *B32B 2307/732* (2013.01); *B32B 2605/00* (2013.01)

(58) Field of Classification Search
  CPC ..... B29C 44/54; B29C 44/56; B60R 13/0838; F02B 77/11; B29K 2077/00; B29K 2105/048; B29L 2031/30; B29L 2031/22; B29L 2031/24
  See application file for complete search history.

(56) References Cited

U.S. PATENT DOCUMENTS

| | | |
|---|---|---|
| 2012/0009401 A1 | 1/2012 | McCoy et al. |
| 2014/0167306 A1 | 6/2014 | Kong |
| 2017/0283555 A1* | 10/2017 | Takano ............... B29C 44/00 |
| 2018/0111349 A1 | 4/2018 | Polidore et al. |
| 2018/0117823 A1 | 5/2018 | Yusa et al. |
| 2018/0200926 A1 | 7/2018 | Yu |
| 2018/0220800 A1 | 8/2018 | Takahashi |

FOREIGN PATENT DOCUMENTS

| | | | |
|---|---|---|---|
| CN | 103862610 A | | 6/2014 |
| CN | 107428113 A | | 12/2017 |
| CN | 107848183 A | | 3/2018 |
| EP | 2955015 A1 | | 12/2015 |
| JP | S58213028 A | | 12/1983 |
| JP | S6042433 A | | 3/1985 |
| JP | S60168638 A | | 9/1985 |
| JP | H04185320 A | | 7/1992 |
| JP | H05124126 A | | 5/1993 |
| JP | H06198755 A | | 7/1994 |
| JP | H07285141 A | | 10/1995 |
| JP | H08267485 A | | 10/1996 |
| JP | H0939017 A | | 2/1997 |
| JP | H11207759 A | | 8/1999 |
| JP | 2000015758 A | | 1/2000 |
| JP | 2000210967 A | | 8/2000 |
| JP | 2001009923 A | | 1/2001 |
| JP | 2004202915 A | | 7/2004 |
| JP | 2007106973 A | | 4/2007 |
| JP | 2009286030 A | | 12/2009 |
| JP | 2011110836 A | | 6/2011 |
| JP | 2013248847 A | | 12/2013 |
| JP | 2013256059 A | | 12/2013 |
| JP | 2014208418 A | * | 11/2014 |
| JP | 2014208418 A | | 11/2014 |
| JP | 2017171348 A | | 9/2017 |
| TW | I597148 B | | 9/2017 |
| WO | 2013187041 A1 | | 12/2013 |
| WO | 2017022824 A1 | | 2/2017 |

OTHER PUBLICATIONS

Balaji, Anand B., et al. "Natural and synthetic biocompatible and biodegradable polymers." Navinchandra Gopal Shimpi. Biodegradable and biocompatible polymer composites. Oxford: Elsevier (2018): 3-32. (Year: 2018).*

Oct. 13, 2020, International Preliminary Report on Patentability issued in the International Patent Application No. PCT/JP2019/015160.

Jun. 25, 2019, International Search Report issued in the International Patent Application No. PCT/JP2019/015160.

Jun. 29, 2021, the Supplementary European Search Report issued by the European Patent Office in the corresponding European Patent Application No. 19785753.5.

* cited by examiner ly, the present disclosure relates to a foam molded product
and a method of producing the same.

FOAM MOLDED PRODUCT AND METHOD OF PRODUCING SAME

TECHNICAL FIELD

The present disclosure relates to a foam molded product and a method of producing the same.

BACKGROUND

Foam molded products formed of resins are being used as components of automobiles and electronic devices and structural materials for containers in place of conventional solid resin materials and metal materials. These foam molded products have features such as low density, high heat insulation, and shock absorption, and it is mainly these characteristics that are effectively exploited. On the other hand, these foam molded products have poor impact resistance and scratch resistance compared to conventional solid resin materials as a consequence of their low density, and the scope of use thereof has so far been limited.

Moreover, as a result of foam molded products being formed by bead foam shaping or extrusion foam shaping, bead marks where bead foam particles have fused or a surface where the structure of holes by which steam is supplied in foam shaping is transferred may be formed, and thus it has not been possible to achieve the surface smoothness displayed by solid resin materials.

One known technique for providing a foam molded product with impact resistance and scratch resistance is a technique of melting the surface of the foam molded product to form a non-foam layer such as disclosed in Patent Literature (PTL) 1. It is disclosed that in this surface melt-shaping method, the surface of a foam layer is melted by a heated metal plate or a heated mold, a non-foam layer of a certain thickness is shaped through bead foaming pressure or external pressure application, and thus the scratch resistance and rigidity of the surface are improved and a design surface is obtained.

Moreover, one known technique for imparting surface smoothness is a technique of forming a compressed layer at the surface of a foam molded product such as disclosed in PTL 2. It is disclosed that by forming a compressed layer at the surface by this technique, high strength and a smooth surface having better quality of external appearance are achieved.

Furthermore, a technique involving combination with a skin material and formation of a compressed layer at the interface between the skin material and a foam layer such as described in PTL 3 has been disclosed as a technique for imparting design.

CITATION LIST

Patent Literature

PTL 1: JP H7-285141 A
PTL 2: JP H8-267485 A
PTL 3: JP 2014-208418 A

SUMMARY

Technical Problem

However, in a technique such as described in PTL 1, when a surface at which a non-foam layer is to be formed is melted in order to form the non-foam layer, a foam layer below the non-foam layer is simultaneously heated due to heat conduction, which may lead to contraction deformation of the foam molded product during cooling. Consequently, sufficient mold followability cannot be obtained at the surface of the foam molded product, and thus a high-quality texture cannot be obtained.

Moreover, although the formation of a compressed layer as disclosed in PTL 2 makes it possible to obtain good surface smoothness, a melted layer is not formed, and thus a turtle shell pattern of interfaces between pre-expanded particles forming a foam layer remains at the surface of the foam molded product, and mold followability significantly decreases. Furthermore, adequate design at the surface of the foam molded product is not obtained because the exterior of the foam layer has strong light scattering properties under the influence of cells present inside the pre-expanded particles, and thus a glossy surface is not obtained.

Also, in the case of combination with a skin material as described in PTL 3, there is an issue that when a thin skin material such as a fiber-reinforced material, a decorative film, or a non-woven fabric is used, undulations of a foam molded product surface having poor mold followability or irregularities such as a pattern of pre-expanded particles are transferred to the skin material, and thus the quality of texture of the skin material is reduced.

Moreover, when a typical operation of forming a surface layer and a compressive deformation layer by concurrently melting and compressing a foam product surface by hot pressing is performed, there is an issue that the compressive deformation layer, which contains air, contracts and deforms during cooling due to residual heat of the surface layer, and thus a smooth surface layer is not obtained, and the mold followability of a surface provided with a design (hereinafter, referred to as a "design surface") decreases.

Accordingly, the present disclosure relates to a problem of providing a foam molded product having high surface smoothness, excellent design surface mold followability, and excellent rigidity, which has been difficult to achieve with conventional molding processing.

Solution to Problem

As a result of diligent studies, the inventors discovered that by using pre-expanded particles having a specific hardness, by performing pressing in a state in which a surface mold for design surface formation is pre-heated to form a part where foam particles present at the heating surface side are melted and a part where foam particles are softened so as to form a compressive deformation layer formed of selectively softened foam particles, and by controlling the compression ratio imparted to this compressive deformation layer to a specific ratio, the compressive deformation layer can fulfill the role of a cushioning layer, contraction stress of a foam layer accompanying cooling of foam particles that have not been compressed is not transmitted to a surface layer, a design surface can be provided with high mold followability, and excellent rigidity can be maintained.

The primary features of the present disclosure are as follows.

[1] A foam molded product containing a resin and comprising a surface layer, a compressive deformation layer, and a foam layer, wherein
the surface layer has a thickness of 0.1 mm to 5.0 mm,
the compressive deformation layer is located between the surface layer and the foam layer,
foam particles forming the compressive deformation layer have an average H/L of 0.5 or less, where H is length in a compression direction and L is length in a perpendicular direction relative to the compression direction, and foam particles forming the foam layer have an expansion ratio of not less than 3.0 times and less than 30 times.

[2] The foam molded product according to [1], wherein the surface layer and the foam layer are formed of the same type of resin.

[3] The foam molded product according to [1] or [2], wherein an upper surface of the surface layer has an image clarity of 30% or more.

[4] The foam molded product according to any one of [1] to [3], wherein the surface layer is provided with a textured shape.

[5] The foam molded product according to any one of [1] to [4], used as an engine cover or an engine under cover.

[6] The foam molded product according to any one of [1] to [5], wherein the resin is a crystalline resin having a melting point of 145° C. or higher or an amorphous resin having a glass-transition temperature of 145° C. or higher.

[7] The foam molded product according to any one of [1] to [6], wherein the resin is a polyamide.

[8] A method of producing the foam molded product according to any one of [1] to [7], comprising:

causing foaming and fusing of pre-expanded particles containing a resin to form a foam product including a foam layer formed of foam particles;

arranging the foam product in an inner part of a mold for foam shaping that is heated to a temperature not lower than a glass-transition point (Tg) or a melting point of the resin and performing preliminary heating of the foam product;

compressing the foam product to mold dimensions through a pressing mechanism to form a surface layer and a compressive deformation layer; and cooling the mold to solidify the surface layer and obtain a foam molded product.

[9] A method of producing the foam molded product according to any one of [1] to [7], comprising:

loading pre-expanded particles containing a resin into an inner part of a mold for foam molding;

supplying a heating medium of a temperature that causes fusing of the pre-expanded particles into the inner part of the mold and causing foaming and fusing of the pre-expanded particles to form a foam product including a foam layer formed of foam particles;

heating the mold to a temperature not lower than a glass-transition point (Tg) or a melting point of the resin to perform preliminary heating of the foam product;

compressing the foam product to mold dimensions through a pressing mechanism to form a surface layer and a compressive deformation layer; and cooling the mold to solidify the surface layer and obtain a foam molded product.

Advantageous Effect

According to the present disclosure, it is possible to provide a foam molded product having high surface smoothness, excellent design surface mold followability, and excellent rigidity, and a method of producing this foam molded product.

DETAILED DESCRIPTION

The following provides a detailed description of a disclosed embodiment (hereinafter, also referred to as the "present embodiment"). However, the following embodiment is intended to be illustrative for describing the present disclosure, and the present disclosure is not limited to the following embodiment and can be implemented with various alterations that are within the essential scope thereof.

Note that in the embodiment of the present disclosure, "A (value) to B (value)" means "not less than A and not more than B".

[Foam molded product]

Figure 1:
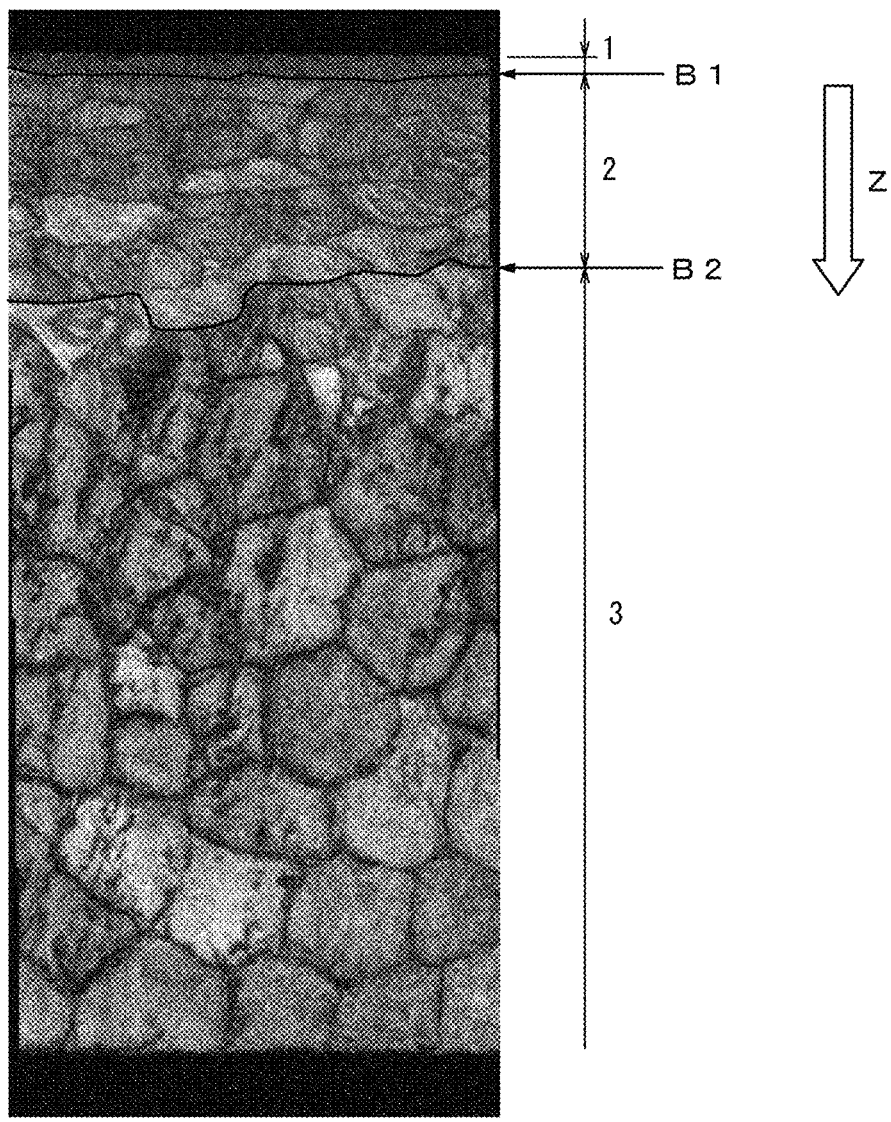
FIG. 1 illustrates an example of a compression direction cross-sectional view of a foam molded product according to a disclosed embodiment.

FIG. 1 illustrates an example of a cross-sectional view obtained by sectioning a foam molded product according to a disclosed embodiment in a compression direction Z.

A presently disclosed foam molded product has a three-layer structure composed of a surface layer 1, a compressive deformation layer 2, and a foam layer 3 as illustrated in FIG. 1.

Each of the layers is formed of foam particles containing a resin and can be defined by the shape of the foam particles from which it is formed, and more specifically by the presence or absence of a closed cell structure and H/L of the foam particles. For example, in the cross-sectional view of FIG. 1, a boundary B1 between the surface layer 1 and the compressive deformation layer 2 and a boundary B2 between the compressive deformation layer 2 and the foam layer 3 can be distinguished (FIG. 1).

The overall thickness of the foam molded product is preferably not less than 3 mm and not more than 5,000 mm. The term "thickness" as used herein refers to the average value of a compression direction dimension of the foam molded product.

A thickness of 3 mm or more is preferable in terms that this makes the foam molded product self-supporting and enables use thereof as a structural component, and a thickness of 5 mm or more is more preferable.

Moreover, a thickness of 5,000 mm or less is preferable in terms of obtaining a molded article using a hot pressing machine or a foam molding machine.

The rigidity of the foam molded product can be evaluated by measuring the flexural modulus of the foam molded product. A larger value for the flexural modulus signifies better rigidity.

The flexural modulus of the foam molded product can be measured in accordance with JIS K7171(2008). The flexural modulus of the foam molded product can be adjusted by altering the thickness and/or the material of the surface layer 1 and/or the compressive deformation layer 2 so as to strengthen flexural rigidity of the foam layer 3.

The flexural modulus of the foam molded product is preferably 100 MPa or more, more preferably 120 MPa or more, and even more preferably 130 MPa or more.

The surface layer 1 is defined as a layer in which a closed cell structure of foam particles has been eliminated through melting.

The compressive deformation layer 2 is defined as a layer that is located between the surface layer 1 and the foam layer 3 and that is formed of foam particles for which H/L, expressed by the length (H) in the compression direction and the length (L) in a perpendicular direction relative to the compression direction, is 0.5 or less.

The foam layer 3 is defined as a layer formed of foam particles for which H/L is more than 0.5.

The compression direction Z for the foam molded product according to the present embodiment can be identified by a method described in the subsequent EXAMPLES section.

[[Closed Cell Ratio]]

The closed cell ratio of the disclosed foam molded product is not specifically limited but is preferably not less than 30% and not more than 99%. When the closed cell ratio is within this range, elastic repulsive force during compression can be maintained, followability to a mold can be improved, and a design surface having high surface smoothness can be formed.

The closed cell ratio of the foam molded product according to the present embodiment is more preferably not less than 80% and not more than 99%, and even more preferably not less than 85% and not more than 99% in terms that strength of the foam molded product is improved, uptake of water into resin that can occur in an open cell section is inhibited, and the density of the foam molded product tends not to decrease.

Note that the closed cell ratio S (%) is calculated by a formula expressed by the following formula (1).

$$S(\%) = \{(Vx - W/\rho)/(Va - W/\rho)\} \times 100 \quad (1)$$

In the preceding formula, $Vx$ is the true volume ($cm^3$) of the foam molded product, $Va$ is the apparent volume ($cm^3$) of the foam molded product, $W$ is the weight (g) of the foam molded product, and $\rho$ is the density ($g/cm^3$) of a base material resin of the foam molded product.

The expansion ratio of foam particles forming the foam layer of the disclosed foam molded product is preferably 3.0 times or more, and more preferably 5.0 times or more from a viewpoint of weight reduction. Moreover, the expansion ratio is preferably less than 30 times, and more preferably 20 times or less from a viewpoint that elastic repulsive force during compression can be maintained. The expansion ratio expresses the degree of expansion of the volume of the foam particles from a base material resin state that occurs through inclusion (impregnation) of a blowing agent, preliminary foaming, and a final stage of foaming.

The expansion ratio of the foam particles forming the foam layer of the foam molded product can be calculated by dividing the density of the base material resin (starting material) forming the foam layer by the apparent density of a foam layer section of the foam molded product that is a final product.

Alternatively, the expansion ratio may be calculated by dividing the density of the base material resin by the apparent density of a foam product that is an intermediate product. This is because the foam particles forming the foam layer do not tend to be affected by pressurizing compression in a production process of the foam molded product due to the presence of foam particles forming the surface layer and the compressive deformation layer, and thus the expansion ratio thereof directly before pressurizing compression can be maintained.

The expansion ratio can, more specifically, be calculated by a method described in the subsequent EXAMPLES section.

[[Foam Particles and Pre-Expanded Particles]]

The disclosed foam molded product contains a resin in the form of foam particles.

The term "foam particles" as used in the present disclosure refers to particles that form a foam molded product and a foam product according to the present embodiment and that are expanded particles that have undergone a final stage of foaming of pre-expanded particles.

Moreover, the term "pre-expanded particles" as used in the present disclosure refers to expandable particles that have not undergone a final stage of foaming and is inclusive of a state from before implementation to after implementation of preliminary foaming that is not a final stage.

Resin

The resin can be a thermoplastic resin or the like, for example, without any specific limitations.

Examples of thermoplastic resins that can be used include, but are not specifically limited to, styrene-based polymers such as polystyrene, poly($\alpha$-methylstyrene), a styrene-maleic anhydride copolymer, a blend or graft polymer of polyphenylene oxide and polystyrene, an acrylonitrile-styrene copolymer, an acrylonitrile-butadiene-styrene polymer, a styrene-butadiene copolymer, and high-impact polystyrene; vinyl chloride-based polymers such as polyvinyl chloride, a vinyl chloride-vinyl acetate copolymer, chlorinated polyvinyl chloride, and a copolymer of ethylene or propylene with vinyl chloride; polyvinylidene chloride-based copolymer resins; homo- and copolymerization polyamide resins such as nylon-6 and nylon-6,6; homo- and copolymerization polyester-based resins such as polyethylene terephthalate; modified polyphenylene ether resins (phenylene ether-polystyrene alloy resins); polycarbonate resins; methacrylimide resins; polyphenylene sulfide resins; polysulfone resins; polyethersulfone resins; phenolic resins; urethane resins; and polyolefin-based resins.

Examples of polyolefin-based resins that can be used include polypropylene-based resins such as polypropylene, an ethylene-propylene random copolymer, a propylene-butene random copolymer, an ethylene-propylene block copolymer, and an ethylene-propylene-butene terpolymer, and also low-density polyethylene, medium-density polyethylene, linear low-density polyethylene, linear ultra-low-density polyethylene, high-density polyethylene, an ethylene-vinyl acetate copolymer, an ethylene-methyl methacrylate copolymer, an ionomer resin, and the like that are polymerized using a Ziegler catalyst, a metallocene catalyst, or the like. One of these polyethylene-based resins may be used individually, or two or more of these polyethylene-based resins may be used as a mixture.

Examples of particularly preferable thermoplastic resins include polyolefin-based resins, polyamide resins, polyester resins, polyether resins, methacrylic-based resins, and modified polyether resins (phenylene ether-polystyrene alloy resins). Of these examples, a polyamide resin is an example of a resin that has excellent heat resistance, chemical resistance, and solvent resistance and is suitable for applications as a high heat resistance foam molded product, and a modified polyether resin (phenylene ether-polystyrene alloy resin) is an example of a resin having excellent heat resistance and high-temperature rigidity.

The surface tension of the thermoplastic resin at 20° C. is preferably not less than 35 mN/m and not more than 60 mN/m, more preferably not less than 36 mN/m and not more than 57 mN/m, and even more preferably not less than 37 mN/m and not more than 55 mN/m. When the surface tension of the thermoplastic resin is within any of the ranges set forth above, a foam molded product having high mechanical strength is obtained, and a design surface can be provided with rigidity.

The surface tension of the thermoplastic resin is a value measured by changing the measurement temperature to 20° C. in the method described in JIS K6768:1999 (Plastics-Film and sheeting-Determination of wetting tension).

The thermoplastic resin may be used in a non-crosslinked state or may be used after crosslinking using a peroxide, radiation, or the like.

Compounding Agents

The resin may contain typical compounding agents such as antioxidants, light stabilizers, ultraviolet absorbers, flame retardants, coloring agents (dyes, pigments, etc.), plasticizers, lubricants, crystallization nucleating agents, and inorganic fillers (talc, calcium carbonate, etc.), for example, as necessary depending on the objective.

Examples of flame retardants that can be used include flame retardants based on bromine and phosphorus. Examples of antioxidants that can be used include antioxidants based on phenol, phosphorus, and sulfur. Examples of light stabilizers that can be used include light stabilizers based on hindered amines and benzophenone.

A cell regulator may be added in a situation in which it is necessary to adjust the average cell diameter of the pre-expanded particles. The cell regulator may be talc, silica, calcium silicate, calcium carbonate, aluminum oxide, titanium oxide, diatomaceous earth, clay, sodium bicarbonate, alumina, barium sulfate, aluminum oxide, bentonite, or the like, and the amount thereof that is used is normally 0.005 parts by mass to 2 parts by mass per 100 parts by mass of the total amount of raw material of the pre-expanded particles.

The pre-expanded particles can be obtained by causing inclusion (impregnation) of a blowing agent in a resin such as described above that has been pelletized and then causing foaming to occur. This foaming is preliminary foaming rather than a final stage of foaming.

The blowing agent that is used in production of the pre-expanded particles may be a volatile blowing agent or the like. Examples of volatile blowing agents that can be used include chain and cyclic lower aliphatic hydrocarbons such as methane, ethane, propane, butane, isobutane, pentane, isopentane, neopentane, hexane, heptane, cyclopentane, cyclohexane, and methylcyclopentane; halogenated hydrocarbons such as di cyclodifluoromethane, trichloromonofluoromethane, 1-chloro-1,1-difluoroethane, and 1-chloro-2,2,2-trifluoroethane; and blowing agents based on inorganic gases such as nitrogen, air, and carbon dioxide.

The average particle diameter of the pre-expanded particles can be measured by measuring 100 g of the pre-expanded particles by a classification method using standard sieves prescribed by JIS Z8801-1:2006. The average particle diameter of the pre-expanded particles is preferably 1.0 mm to 4.0 mm, and more preferably 1.2 mm to 3.0 mm. An average particle diameter of less than 1.0 mm is undesirable because handling during production steps is difficult, whereas an average particle diameter of more than 4.0 mm is undesirable because the surface accuracy of a complicated shaped article tends to decrease.

The shape of the pre-expanded particles according to the present embodiment may be any of various shapes without any specific limitations.

The production method of the pre-expanded particles can be a method that exploits thermoplasticity of the thermoplastic resin or a method involving after processing such as machining of resin particles in a solid state, and any method may be adopted so long as it is a method that makes it possible to impart a desired external shape to the particles. In particular, profile extrusion using a die provided with an ejection cross-section can suitably be used as a method that has excellent productivity and enables production of particles with a consistent shape. Production can be performed by freely adopting a method commonly known in the art as the profile extrusion method. Examples of such commonly known methods include a method in which a thermoplastic resin is melt-extruded by an extruder and is pelletized by a method typically used in industry such as strand cutting or underwater cutting to obtain base material resin pellets, and then the base material resin pellets are caused to foam to obtain pre-expanded particles; a method in which a blowing agent is injected from partway along the barrel of an extruder so as to perform foaming concurrently with ejection, and then, after cooling, underwater cutting or strand cutting is performed to directly obtain pre-expanded particles; and a method in which a thermoplastic resin is melted inside an extruder, is extruded from a die having a desired cross-sectional shape, is cooled, and is subsequently cut to a certain length by a pelletizer to produce base material resin pellets, and then the base material resin pellets are impregnated with a blowing agent and are heated to cause foaming to a certain expansion ratio.

The method of inclusion (impregnation) of a blowing agent in the resin is not specifically limited and may be a typically used method.

Examples of such methods include, but are not specifically limited to, a method performed using an aqueous medium in a suspension of water or the like (suspension impregnation), a method using a thermal decomposition-type blowing agent such as sodium bicarbonate (blowing agent decomposition), a method in which a gas is set as an atmosphere of equal or higher pressure than the critical pressure and is brought into contact with the base material resin in a liquid phase state (liquid phase impregnation), and a method in which a gas is set as an atmosphere of lower pressure than the critical pressure and is brought into contact with the base material resin in a gas phase state (gas phase impregnation).

Shape of Particles or Pellets of Base Material Resin

Any three-dimensional shape can be imparted to particles or pellets of the base material resin serving as a raw material of the pre-expanded particles. Examples of such three-dimensional shapes include, but are not specifically limited to, a solid bead shape, a bead shape including a hollow part, and a bead shape including a recessed external part.

Figure 4C:
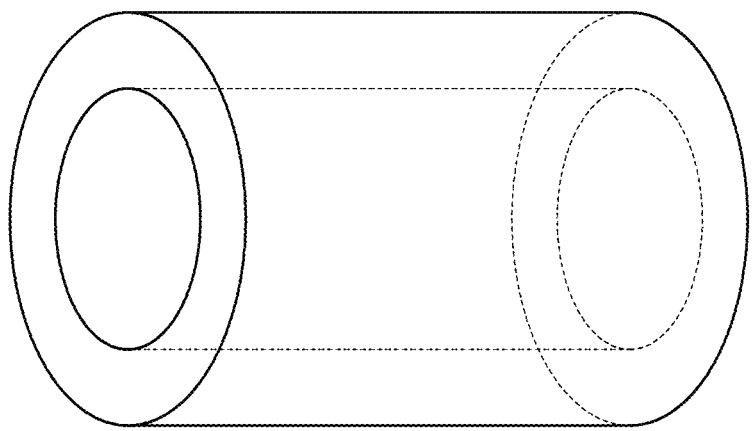
FIG. 4C is a cross-sectional view illustrating a hollow part of a pellet or particle of a base material resin according to a disclosed embodiment.

An orthographic projection of a particle or pellet of the base material resin can have any shape. A typical solid bead shape is a roughly spherical shape having an orthographic projection that is a circular shape or an elliptical shape. The phrase "including a hollow part" means that an orthographic projection of the particle or pellet includes an internal hollow region while also including a peripheral region that surrounds the hollow circular region, and that there is a direction for which an orthographic projection including this hollow region and this peripheral region is obtained. FIG. 4C illustrates an example of a hollow part.

Figure 4B:
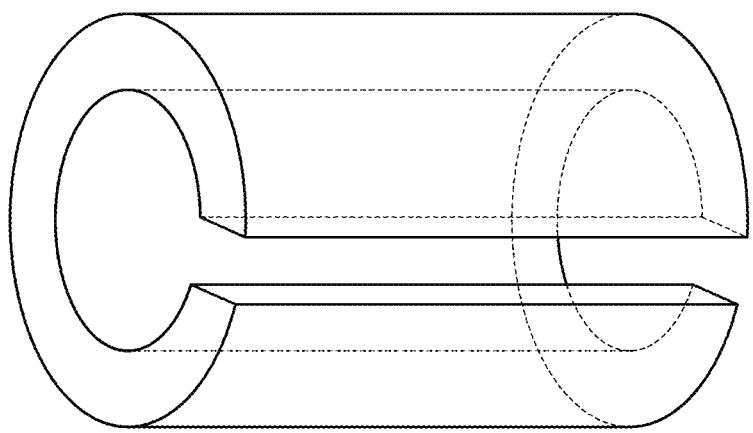
FIG. 4B is a cross-sectional view illustrating a recessed external part of a pellet or particle of a base material resin according to a disclosed embodiment.
Figure 4A:
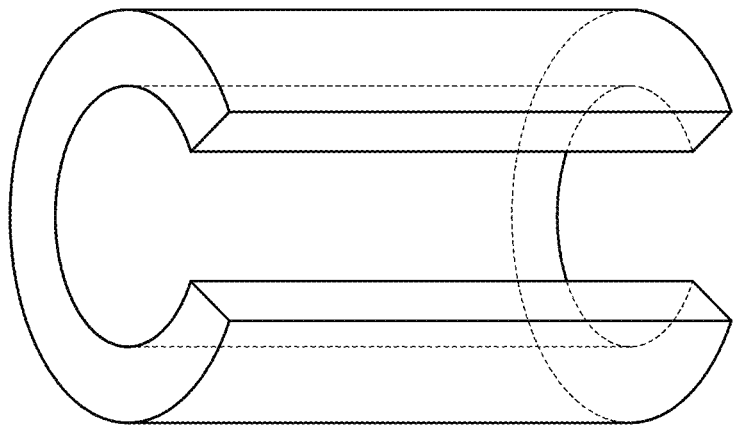
FIG. 4A is a cross-sectional view illustrating a recessed external part of a pellet or particle of a base material resin according to a disclosed embodiment.

Moreover, the phrase "including a recessed external part" means that there is a direction for which the obtained orthographic projection of the particle or pellet is a recessed geometric shape. The term "recessed geometric shape" as used in the present specification means that it is possible to select two points on the outer surface of an orthographic projection geometric shape that is a recessed geometric shape such that at least part of a line segment linking these points (preferably the whole line segment) is a line segment passing through a region external to the particle or pellet. FIGS. 4A and 4B illustrate examples of recessed geometric shapes. Note that the recessed external part is a different structure to foam cells formed during foaming. One recessed external part may be present or a plurality of recessed external parts may be present.

The following provides a more specific description of each layer of the three-layer structure of the foam molded product according to the present embodiment.

[[Foam Layer]]

Foam particles of the foam layer are defined by the length (H) in a compression direction and the length (L) in a perpendicular direction relative to the compression direction. The disclosed foam layer is formed of foam particles for which H/L is more than 0.5.

The thickness of the foam layer is not specifically limited but is preferably not less than 1 mm and not more than 5,000 mm, more preferably not less than 3 mm and not more than 1,000 mm, and even more preferably not less than 5 mm and not more than 500 mm. It is preferable for the thickness of the foam layer to be within any of the ranges set forth above from a viewpoint that a shaped article can be self-supporting as a structure and that a shaped article can be obtained using a practical hot pressing machine or foam molding machine.

Note that the thickness of the foam layer is determined by subtracting the thicknesses of the subsequently described surface layer and compressive deformation layer from the thickness of the overall molded product measured in the compression direction.

The hardness of the foam layer is preferably a durometer hardness of HDA 10 or more, and more preferably HDA 30 or more. When the durometer hardness is within a range that is not less than any of the above, repulsive force during compression is sufficiently high, and adequate mold followability can be displayed. Moreover, the durometer hardness is preferably HDA 89 or less, and more preferably HDA 85 or less from a viewpoint of providing the foam molded product with impact resistance. When the HDA is not less than any of the above, hardness is excessively high and impact energy cannot be sufficiently absorbed in a foam layer having an excessively high apparent density.

The hardness of the foam layer is measured from a section direction in which the foam molded product is cut out and the durometer hardness of the foam layer is a value measured within 1 second from pressure application by a load of 1 kgf in accordance with JIS K7215:1986. Moreover, the durometer hardness of the foam layer is measured at 30 locations and the arithmetic mean of the measurements is taken to be the durometer hardness of the foam layer. The durometer hardness can be measured using a durometer (for example, a DUROMETER HARDNESS TYPE A (product name) produced by ASKER).

[[Compressive Deformation Layer]]

The compressive deformation layer is present between the surface layer and the foam layer, and since compression causes deformation of cells inside foam particles and a rise in cell internal pressure through a closed cell structure, is adjusted such as to not have volume contraction capacity through temperature change during cooling.

By forming a compressive deformation layer of a suitable thickness, it is possible to impart functions of absorbing strain in cooling and solidification of the surface layer and strain due to compressive deformation of the foam layer when it is unintentionally softened, and of causing a design surface at the surface to display good mold followability.

The average value of H/L (also referred to as "average H/L" in the present specification) of foam particles forming the compressive deformation layer is 0.50 or less, preferably 0.47 or less, and more preferably 0.45 or less.

A compression ratio of the foam particles forming the compressive deformation layer can be expressed by H/L, and when the average H/L is 0.5 or less, a phenomenon in which resin softened by heating follows and deforms with linear expansion change due to air in closed cells inside the foam particles does not occur.

Since volume contraction of air due to cooling to room temperature (300 K) is anticipated to be 20% to 48% in the case of a typical resin having a melting temperature of 100° C. to 300° C., applying pressurizing compression equivalent to this volume contraction to foam particles can inhibit compressive deformation of the foam molded product accompanying volume contraction of air in a cooling process. Therefore, the compression ratio H/L is set as 0.50 or less.

Moreover, it is preferable for the average H/L of the foam particles of the compressive deformation layer to be 0.1 or more because the compressive elastic modulus is low and mold followability in foam molding can be increased.

The thickness of the compressive deformation layer is preferably 0.2 mm or more. When the thickness is at least this value, contraction stress accompanying cooling of foam particles of the foam layer can be absorbed, and surface smoothness and design surface image clarity can be maintained. The thickness of the compressive deformation layer is more preferably 0.5 mm or more, and even more preferably 0.7 mm or more.

From a viewpoint of weight reduction, the thickness of the compressive deformation layer is preferably 10 mm or less, and more preferably 5 mm or less.

Note that the thickness of the compressive deformation layer can be determined by a method described in the subsequent EXAMPLES section.

[[Surface Layer]]

The surface layer is a layer in which cell structures that are closed via resin partition walls are not continuously present, but that may have individual cell structures that arise as an exception during a process of forming the surface layer, for example, present in an inner part thereof. A layer in which cell structures closed via resin partition walls are continuously present is considered to be the compressive deformation layer or the foam layer.

The thickness of the surface layer is not specifically limited but is preferably 0.1 mm or more from a viewpoint of displaying mechanical characteristics. Impact resistance can be displayed when the thickness of the surface layer is 0.1 mm or more. Moreover, the thickness of the surface layer is preferably 0.2 mm or more from a viewpoint of bending strength and compressive strength, and is preferably 5 mm or less from a viewpoint of weight reduction of the foam molded product.

Note that the thickness of the surface layer can be determined by a method described in the subsequent EXAMPLES section.

The surface layer is preferably formed of the same type of resin as the compressive deformation layer and the foam layer from a viewpoint of adhesive strength at the interface between the surface layer and the compressive deformation layer. The phrase "same type of resin" means that a resin component exclusive of additives such as plasticizers and heat stabilizers is formed of the same resin in classification according to JIS K-6899-1:2006. More specifically, resins that are classified as the same resin through a combination of "5. Abbreviated terms related to homopolymer materials, copolymer materials, and natural polymer materials" and "6. Symbols indicating characteristics" of the aforementioned JIS standard are considered to be of the same type.

For example, in a case in which the surface layer, the compressive deformation layer, and the foam layer are each a modified polyphenylene ether resin, these layers are formed of the same type of resin.

Moreover, in a case in which the surface layer, the compressive deformation layer, and the foam layer are each formed of foam particles having a mixture of polyamide 6 resin and polyamide 66 resin as a base material resin, the surface layer, the compressive deformation layer, and the foam layer are each formed of the same type of resin because polyamide 6 resin and polyamide 66 resin are both classified as polyamide homopolymers. In this case, these three layers are considered to be formed of the same type of resin even when the mixing ratio of polyamide 6 resin and polyamide 66 resin differs between the resin mixtures forming the three layers.

The durometer hardness of the surface layer is preferably HDA 90 or more, and more preferably HDA 92 or more. Sufficient scratch resistance is not obtained when the durometer hardness of the surface layer falls below these ranges.

The durometer hardness of the surface layer is a value measured within 1 second from pressure application by a load of 1 kgf in accordance with JIS K7215:1986 with respect to an upper surface of the surface layer (i.e., a design surface). Moreover, the durometer hardness of the surface layer is measured at 30 locations and the arithmetic mean of the measurements is taken to be the durometer hardness of the surface layer.

[[Image Clarity of Upper Surface (Design Surface) of Surface Layer]]

Image clarity (%) evaluated using an image clarity measurement apparatus can be used as an indicator of smoothness of an upper surface (design surface) of the surface layer of the foam molded product according to the present embodiment. Higher image clarity signifies better surface smoothness.

Although no specific limitations are made, the design surface image clarity of the foam molded product according to the present embodiment is preferably 30% or more, more preferably 50% or more, and even more preferably 70% or more. When the image clarity of the design surface is within any of the ranges set forth above, the design surface has sufficient surface smoothness and can be provided with good image clarity.

In a case in which the design surface is flat, the surface smoothness can be evaluated by an evaluation method such as described above.

On the other hand, the design surface may have a curved surface shape or fine irregularities such as a textured shape may be imparted to the design surface. Such shapes can be imparted through appropriate selection of the mold shape.

Although the image clarity of a design surface cannot be measured using an image clarity measurement apparatus such as described above in this case, it is possible to provide a foam molded product having good mold followability and excellent design through a production method according to the present embodiment in the same manner as in a case in which the design surface is flat.

[Production Method of Foam Molded Product]

The method by which the foam molded product according to the present embodiment is produced is not specifically limited and may be the following first embodiment, second embodiment, or the like, for example.

First embodiment: A method including a step of causing foaming and fusing of pre-expanded particles containing a resin to form a foam product including a foam layer formed of foam particles; a step of arranging the foam product in an inner part of a mold for foam molding that is heated to not lower than the glass-transition point (Tg) or the melting point of the resin and performing preliminary heating of the foam product; a step of compressing the foam product to mold dimensions through a pressing mechanism to form a surface layer and a compressive deformation layer; and a step of cooling the mold to solidify the surface layer and obtain the disclosed foam molded product having a design surface.

Second embodiment: A method including a step of loading pre-expanded particles containing a resin into an inner part of a mold for foam molding; a step of supplying a heating medium of a temperature that causes fusion of the pre-expanded particles into the inner part of the mold and causing foaming and fusing of the pre-expanded particles to form a foam product including a foam layer formed of foam particles; a step of heating the mold to not lower than Tg or the melting point of the resin and performing preliminary heating of the foam product; a step of compressing the foam product to mold dimensions through a pressing mechanism to form a surface layer and a compressive deformation layer; and a step of cooling the mold to solidify the surface layer and obtain the disclosed foam molded product having a design surface.

[[Production Method of First Embodiment]]

The following provides a specific description of the first embodiment of a method of producing the disclosed foam molded product (hereinafter, referred to as the "production method according to the first embodiment").

A feature of the production method according to the first embodiment is the inclusion of: a step of causing foaming and fusing of pre-expanded particles containing a resin to form a foam product including a foam layer formed of foam particles;

a step of arranging the foam product in an inner part of a mold for foam shaping that is heated to not lower than the glass-transition point (Tg) or the melting point of the resin and performing preliminary heating of the foam product;

a step of compressing the foam product to mold dimensions through a pressing mechanism to form a surface layer and a compressive deformation layer; and a step of cooling the mold to solidify the surface layer and obtain a foam molded product.

The following describes shaping of the foam product prior to performing compression molding.

Foam Product

The foam product is a shaped product in which pre-expanded particles have undergone a final stage of foaming and have been fused to one another. In other words, the foam product according to the present embodiment is a shaped product having at least a section in which foam particles resulting from two or more pre-expanded particles undergoing a final stage of foaming are fused to one another.

Foam Product Shaping Step

The method by which the pre-expanded particles are shaped into the foam product is not specifically limited, and the shaping may be performed by, for example, loading the pre-expanded particles into a cavity of a mold for shaping, performing heating to cause foaming and concurrent thermal fusing of pre-expanded particles to one another, and then performing cooling to solidify the product. The method by which the pre-expanded particles are loaded is not specifically limited and may, for example, be a cracking method in which the pre-expanded particles are loaded with the mold in a slightly opened state, a compression method in which pressure compressed pre-expanded particles are loaded with the mold in a closed state, or a compression cracking method in which the above cracking method is adopted after loading pressure compressed pre-expanded particles into the mold.

Herein, it is preferable that the pre-expanded particles are pressure treated with a gas prior to being loaded into the cavity of the mold for shaping from a viewpoint of providing a uniform gas pressure in cells of the pre-expanded particles and obtaining a more uniform cell size inside the particles. The gas used in this pressure treatment is not specifically limited but is preferably an inorganic gas from a viewpoint of flame retardance, heat resistance, and dimensional stability. The inorganic gas and method of pressure treatment are the same as in a situation in which pre-expanded particles are pressure treated with a gas prior to foaming in the previously described method of foaming polyamide-based resin.

A heating medium used in shaping of the pre-expanded particles into the foam product may be a general-purpose heating medium, is preferably saturated steam or superheated steam from a viewpoint of inhibiting oxidative degradation of the foam product, and is more preferably saturated steam from a viewpoint that uniform heating of the foam product is possible.

In production of the foam product, either of a method in which the pre-expanded particles are loaded into a closed mold and are caused to foam to obtain the foam product or a method in which the pre-expanded particles are loaded into a mold that cannot be sealed and are heated to fuse the pre-expanded particles to one another may be adopted. A general-purpose in-mold foaming automated shaping machine can be used in accordance with the type of resin and the shaping conditions.

Moreover, the pre-expanded particles may be heated in two stages to cause foaming and fusing and to shape the pre-expanded particles into the foam product as described below for the production method according to the second embodiment.

The foam product that has been shaped as described above may be cooled prior to removal from the mold by supplying cooling water into the cavity through a water cooling nozzle.

Foam products that each constitute one or two layers among a foam layer, a compressive deformation layer, and a surface layer may be separately shaped, these foam products may be arranged in a stacked manner in the desired order in a mold, and then the subsequently described compression molding may be performed.

Alternatively, one foam product constituting a foam layer or constituting a foam layer and a compressive deformation layer may be shaped in advance, the foam product may be arranged in a separate mold, pre-expanded particles for a compressive deformation layer and a surface layer or for a surface layer may be loaded in a stacked manner, foaming and shaping may be performed, and then the subsequently described compression molding may be performed with respect to the newly obtained foam product.

Further alternatively, one foam product constituting a foam layer or constituting a foam layer and a compressive deformation layer may be shaped in advance, the foam product may be arranged in a mold, pre-expanded particles for a compressive deformation layer and a surface layer or for a surface layer may loaded in a stacked manner, and then in-mold foaming and shaping and compression molding that are subsequently described for the second embodiment may be performed.

A technique such as described above is effective in a case in which the base material resins forming the various layers of the foam molded product have different melting points or glass-transition temperatures to one another, and specifically in a case in which these base material resins are mixtures classified as the same type of resin but have significantly different mixing ratios or a case in which these base material resins are different types of resins.

In the production method according to the first embodiment, the foam product is subjected to the following preliminary heating step, compression step, and cooling step so as to perform compression molding of the foam product to obtain a foam molded product.

The following describes each step of compression molding in the production method according to the first embodiment.

Preliminary Heating Step

In the production method according to the first embodiment, it is preferable that a preliminary heating step of heating the foam product to not lower than the glass-transition temperature of an amorphous thermoplastic resin or not lower than the melting point of a crystalline thermoplastic resin is performed before the compression step. By implementing the preliminary heating step, a surface part of the foam product can be melt-fluidized, and a part where a compressive deformation layer is to be formed can be selectively heated and softened. By subsequently performing steps of compression and rapidly cooling the mold, it is possible to obtain a foam molded product that has a compressive deformation layer and a smooth surface layer having good image clarity in a surface part of the foam molded product.

Heating Conditions

In a case in which the resin is an amorphous resin, the heating temperature of the foam product in the preliminary heating step is preferably not lower than Tg° C. and lower than (Tg+100)° C., and more preferably not lower than (Tg+10)° C. and lower than (Tg+90)° C., where "Tg (° C.)" is the glass-transition temperature of the resin. When the heating temperature of the foam product is too low, the fluidity of melted resin is poor and cells arising at an obtained design surface are not eliminated, which may result in the design surface of the foam molded product having poor design. Moreover, when the heating temperature of the foam product is too high, heating reaches as far as the inside of the foam layer and contraction occurs during cooling, and thus elastic repulsive force is not obtained during compression and surface smoothness may decrease.

The glass-transition temperature of an amorphous resin refers to a value measured by differential scanning calorimetry (DSC) in accordance with JIS K7121. A peak indicating heat absorption that appears in measurement is taken to be a peak indicating melting, and the temperature at a peak indicating heat absorption that appears furthest to the high-temperature side is taken to be the glass-transition temperature. The measurement apparatus may be a commercially available differential scanning calorimeter such as a "DSC6220" (product name) produced by SII NanoTechnology Inc.

The glass-transition temperature of an amorphous resin referred to in present disclosure is measured by a method described in JIS K7121:1987 (Testing method for transition temperatures of plastics). However, the sampling method and temperature conditions are as follows. A DSC curve is obtained using a differential scanning calorimeter by loading approximately 6 mg of a sample into an aluminum measurement vessel such that the bottom of the vessel is completely covered, and, under a nitrogen gas flow rate of 20 mL/min, heating the sample from 30° C. to 290° C. (1ˢᵗ heating), holding the sample at 290° C. for 10 minutes, subsequently cooling the sample from 290° C. to 30° C. (cooling), holding the sample at 30° C. for 10 minutes, and subsequently heating the sample from 30° C. to 290° C. ($2^{nd}$ heating). Note that all heating and cooling is performed at a rate of 10° C./min and that alumina is used as a reference material.

In a case in which the foam resin is a crystalline resin, the heating temperature is preferably not lower than Tm° C. and lower than (Tm+100)° C., and more preferably not lower than (Tm+10)° C. and lower than (Tm+90)° C., where "Tm (° C.)" is the melting point temperature. When the heating temperature of the foam molded product is too low, the fluidity of melted resin is poor and cells arising at an obtained design surface are not eliminated, which may result in the foam molded product having poor design. Moreover, when the heating temperature of the foam molding is too high, heating reaches as far as the inside of the foam layer and contraction occurs during cooling, and thus elastic repulsive force is not obtained during compression and surface smoothness may decrease.

The melting point of a crystalline resin is measured by the following procedure. A sample of 6 mg of the resin is collected. A differential scanning calorimeter is used to heat the sample from 30° C. to 290° C. at a heating rate of 10° C./min and hold the sample at 290° C. for 10 minutes under nitrogen gas flow at a rate of 20 mL/min inside the calorimeter. Thereafter, the sample is promptly removed from the calorimeter and is cooled to 30° C. Thereafter, the sample is reheated to 290° C. inside the calorimeter at a heating rate of 10° C./min under nitrogen gas flow at a rate of 20 mL/min, and the melting point (midpoint) is calculated from a DSC curve obtained at this time. Alumina is used as a reference material in the measurement. The differential scanning calorimeter can be a differential scanning calorimeter that is commercially available from SIT Nanotechnology Inc. as a "DSC6220" (product name), for example.

The temperature in the preliminary heating step may be raised in two or more stages at any heating rate so long as it is within any of the ranges set forth above. Moreover, in a case in which molds at both sides are for surfaces that are to be provided with a design, pre-heating may be performed by setting a plurality of molds to different temperatures in order to inhibit shaped article warping after cooling.

The heat source of the mold is preferably steam from a viewpoint of the rate of heating. Saturated steam is preferable from a viewpoint of uniformity of heating, and superheated steam obtained by superheating saturated steam may be used.

It is preferable that the foam product is not compressed in the preliminary heating step. By implementing the preliminary heating step without compressing the foam product, open cells arising at the surface of the foam product as a result of heating and melting can be effectively eliminated.

Compression Step

The compression step may be performed by a pressing mechanism of a hydraulic type or a pressing mechanism of an electrically powered type through a servo drive mechanism. In particular, the use of a drive mechanism acting through positional control in formation of the compressive deformation layer is preferable from a viewpoint that a compression operation can be performed in stages in accordance with the cooling rate, compression can be performed in a state in which mold followability is constantly obtained through elastic repulsive force of the foam layer, and flatness is improved.

Compression Conditions

Compression of the foam product in the compression step is preferably adjusted such that the average H/L of the compressive deformation layer in the obtained foam molded product is 0.5 or less.

The compression ratio of the foam product can be adjusted by adjusting the degree of pressure application to the foam product. For example, the method by which the compressive deformation ratio of the foam product is adjusted may be a method in which the foam product is held in the thickness direction thereof by pressing members and in which pressing force applied to the foam product through these pressing members is adjusted. During the above, it is preferable that spacers are arranged externally to the foam product, such as outward of both edges in a width direction or length direction of the foam product. By adjusting the height of the spacers, the degree of pressure application to the foam product and the compressive deformation ratio of the foam product can be easily adjusted.

Note that in a case in which spacers are used, the spacers are arranged externally to the foam product, are arranged at least outward of both edges in a width direction or a length direction of the foam product, for example, and may be arranged both outward of both edges in a width direction of the foam product and outward of both edges in a length direction of the foam product.

Moreover, the inclusion of a servo mechanism that can press the pressing mechanism itself in stages is preferable from a viewpoint that the compression ratio can be freely adjusted and compression can be performed in accordance with the cooling rate.

A suitable example of an apparatus including such a compression mechanism is a specialized mold for compression molding including a moveable mold such as disclosed in JP 2015-112827 A.

Cooling Step

The cooling step can suitably be implemented by a cooling method in which a cooling medium is used.

The cooling step is preferably performed concurrently with the compression step from a viewpoint that the thickness of the compressive deformation layer can be adjusted.

A higher cooling rate is more preferable. Moreover, it is preferable that a heat and cool mold that includes a cooling medium and a heating medium and that enables rapid heating and rapid cooling is used as at least a mold at a side where a design surface is to be formed.

Cooling Conditions

In a case in which the resin is an amorphous resin, the cooling temperature is preferably Tg of the resin or lower, and more preferably Tg−10° C. or lower.

In a case in which the resin is a crystalline resin, the cooling temperature is preferably Tm of the resin or lower, and more preferably Tm−10° C. or lower.

[[Production Method of Second Embodiment]]

The following describes the second embodiment of a method of producing the disclosed foam molded product (hereinafter, referred to as the "production method according to the second embodiment").

The production method according to the second embodiment is a method in which formation of a compressive deformation layer by press driving and formation of a surface layer by heating and cooling are performed concurrently to causing foaming and fusing of pre-expanded particles inside a mold for foam molding and to form a foam product. This method is preferable in terms that a surface layer and a compressive deformation layer can be formed concurrently to molding of a foam molded product and production cost can be significantly reduced by providing an inner part of the mold for foam molding with a heat and cool function and by providing the mold with a compression mechanism such as described in the production method according to the first embodiment.

More specifically, the production method according to the second embodiment includes:

1) a step of loading pre-expanded particles containing a resin into an inner part of a mold for foam molding;

2) a step of supplying a heating medium of a temperature that causes fusion of the pre-expanded particles into the inner part of the mold and causing foaming and fusing of the pre-expanded particles to form a foam product including a foam layer formed of foam particles;

3) a step of heating the mold to not lower than Tg or the melting point of the resin and performing preliminary heating of the foam product to melt mold surface resin;

4) a step of compressing the foam product to mold dimensions through a pressing mechanism to form a surface layer and a compressive deformation layer; and 5) a step of cooling the mold to solidify the surface layer and obtain a foam molded product.

Note that in the production method according to the second embodiment, cooling water may be supplied into the mold by a water cooling nozzle so as to cool the foam molded product at the same time as step 5).

The production method according to the second embodiment for the disclosed foam molded product may include, as steps of in-mold foam shaping in 1) and 2) described above:

a step of loading pre-expanded particles into a cavity of a mold for foam shaping;

a preceding heating step (first stage of heating) of supplying steam at a temperature that is not higher than a thermal fusion temperature of the pre-expanded particles into the cavity for 5 seconds to 30 seconds and performing preliminary heating of the pre-expanded particles; and a subsequent heating step (second stage of heating) of supplying steam at a temperature that is not lower than the thermal fusion temperature of the pre-expanded particles into the cavity for 20 seconds to 120 seconds, and causing foaming and thermal fusing of the pre-expanded particles to obtain a resin foam product.

In other words, in the production method according to the second embodiment, in-mold foam shaping may be performed to obtain a foam product by heating the pre-expanded particles inside the mold for foam molding in two stages.

By performing heating in two stages, preliminary heating of the pre-expanded particles by steam at a temperature not higher than the thermal fusion temperature of the pre-expanded particles in the first stage can provide a more uniform heat distribution throughout the entire assembly of pre-expanded particles. Moreover, as a result of preliminary heating in the first stage, foaming occurs more uniformly in the pre-expanded particles during heating of the pre-expanded particles by steam at a temperature not lower than the thermal fusion temperature in the second stage, and the pre-expanded particles can easily be shaped into a foam product.

In the case of a crystalline resin foam molded product obtained using a crystalline resin, this method makes it possible to increase the crystallite size of the resin, to increase the degree of crystallinity, and to obtain a foam molded product having excellent heat resistance.

The temperature in heating of pre-expanded particles of a thermoplastic resin is preferably close to the thermal fusion temperature (Tf) of the pre-expanded particles of the thermoplastic resin as previously described.

The term "thermal fusion temperature" refers to the temperature at which pre-expanded particles fuse together when heated in saturated steam. The measurement method of the thermal fusion temperature is as follows. The pre-expanded particles are placed in a state in which the pressure inside cells thereof is atmospheric pressure and in which a blowing agent such as a hydrocarbon is not contained therein. After loading 10 g of these pre-expanded particles into a metal mesh vessel such that the pre-expanded particles are in contact with one another, the pre-expanded particles are heated for 30 seconds by saturated steam of a certain temperature. The thermal fusion temperature of the pre-expanded particles is taken to be the lowest temperature (° C.) among temperatures at which at least 80% of all of the pre-expanded particles are fused to one another after heating.

It is desirable that the heating temperature in the first stage is lower than Tf (° C.). This heating temperature is preferably Tf−20° C. or higher, and more preferably Tf−15° C. or higher, and is preferably Tf−2° C. or lower, and more preferably Tf−5° C. or lower.

The heating time of the first stage is preferably 2 seconds or more, and more preferably 3 seconds or more, and is preferably 20 seconds or less, and more preferably 15 seconds or less.

The heating temperature of the second stage is higher than Tf (° C.), and is preferably Tf+15° C. or lower, more preferably Tf+10° C. or lower, and particularly preferably Tf+5° C. or lower.

The heating time of the second stage is preferably 10 seconds or more, and more preferably 15 seconds or more, and is preferably 60 seconds or less, and more preferably 45 seconds or less.

By setting the heating temperature and the heating time of the first and second stages within any of the ranges set forth above, sufficient foaming and thermal fusing of pre-expanded particles of a crystalline resin can be achieved, and a foam molded product in which crystallization of resin has been promoted can be obtained.

The step described above in 3) of the production method according to the second embodiment can be implemented by heating the foam product formed through the steps of in-mold foam shaping described above in 1) and 2), in accordance with the heating conditions previously described for the preliminary heating step in the production method according to the first embodiment. Through this heating, a surface part of the foam product can be melt-fluidized and a part where a compressive deformation layer is to be formed can be selectively heated and softened. By subsequently performing the compression step of 4) and the rapid mold cooling step of 5), it is possible to obtain a foam molded product that has a compressive deformation layer and a smooth surface layer having good image clarity formed in the surface part of the foam molded product.

The step described above in 4) of the production method according to the second embodiment can be performed in the same manner as the compression step previously described in relation to the production method according to the first embodiment.

The pressing mechanism can be a combination of a frame part of a typical in-mold foam shaping machine that presses one-sided opening during loading and cracking after loading and a mold including a moveable piece for forming a compressive deformation layer by compression.

Mold cooling in the step described above in 5) of the production method according to the second embodiment can be performed in the same manner as the cooling step in the production method according to the first embodiment.

Moreover, cooling water is preferably supplied into the mold for foam molding by a water cooling nozzle to cool the foam molded product concurrently to cooling the mold.

[[Mold for Foam Molding]]

The mold for foam molding used in foam molding is not specifically limited, but at least one mold is preferably a heat and cool mold.

The heat and cool mold is provided as a mold at a side where a design surface is to be formed among at least two molds (for example, a core mold and a cavity mold) used in molding, and may be provided as two molds.

With the exception of the above, molds of typical materials and shapes used in production of foam molded products can be used without any specific limitations.

The surface of the mold for foam molding may have an inverted shape in order that the surface of the foam molded product has a desired shape such as a mirror shape, a polyhedral lens cut shape, a conical textured shape, or a delustering layer.

[[Skin Material]]

The foam molded product according to the present embodiment may further include a skin material at an upper surface of the surface layer (i.e., a design surface). In the foam molded product according to the present embodiment, the skin material adhered to the surface layer may form a design surface.

A foam molded product that includes a skin material may, without any specific limitations, be obtained by, in the production method according to the first embodiment or the production method according to the second embodiment, arranging the foam product in an inner part of a mold for foam molding in which the skin material has been arranged in advance or loading pre-expanded particles into the mold for foam molding and performing foam shaping.

A decorative film in which the film surface or a lower surface of a hard coating layer is a print surface or a metal glossy surface that has been subjected to vapor deposition, sputtering, or plating can suitably be used as the skin material.

Moreover, a non-woven fabric product such as a flocked film or felt may be used.

A printed design layer can be formed through printing of various patterns using ink and a printer. Examples of such patterns include wood patterns, stone patterns imitating the surface of rocks such as a marble pattern, cloth patterns imitating cloth texture or cloth form, tile patterns, brick patterns, and the like, and there are also patterns in which these are combined such as mosaics and patchworks. These patterns are normally formed by multicolor printing using the process colors yellow, red, blue, and black, and can also be formed by multicolor printing through spot colors performed by preparing plates of the individual colors making up the pattern.

In terms of decorative materials that provide metal glossiness or texture, a product obtained through formation of a metal layer on a film by vapor deposition, sputtering, plating, or the like can be used as a design surface.

Fiber selected from synthetic fiber such as polyamide-based fiber, polyester-based fiber, polyacrylonitrile-based fiber, polyethylene-based fiber, polypropylene-based fiber, polyvinyl alcohol-based fiber, phenol-based fiber, and regenerated fiber, and natural fiber such as wood pulp, hemp pulp, and cotton linter pulp, and inorganic fiber such as glass fiber can be used individually or as a mixture as a non-woven fabric product.

EXAMPLES

The following describes embodiments of the present disclosure through examples. However, the scope of the present disclosure is not in any way limited by the examples.

Evaluation methods used in the examples and comparative examples were as described below.

(1) Surface Layer Thickness

A foam molded product was cut in a perpendicular direction relative to the surface thereof, and the obtained cross-section was observed using a microscope (VHX-2000 produced by Keyence Corporation). Specifically, a cross-sectional view image such as illustrated in FIG. 1 was acquired. The cross-sectional shape of foam particles in the cross-sectional view image was observed, and the boundary between a surface layer and a compressive deformation layer was identified based on the presence or absence of closed cells. A surface layer is a layer in which cell structures closed by resin partition walls are not continuously present, but may have individual cell structures that arise as an exception during a process of forming the surface layer, for example, present in an inner part thereof. A layer in which cell structures closed by resin partition walls are continuously present is considered to be a compressive deformation layer or a foam layer. The cross-sectional shape of foam particles forming the compressive deformation layer was observed, and a minor axis direction for which the aspect ratio (major axis diameter/minor axis diameter) was largest was identified as the compression direction.

Figure 2:
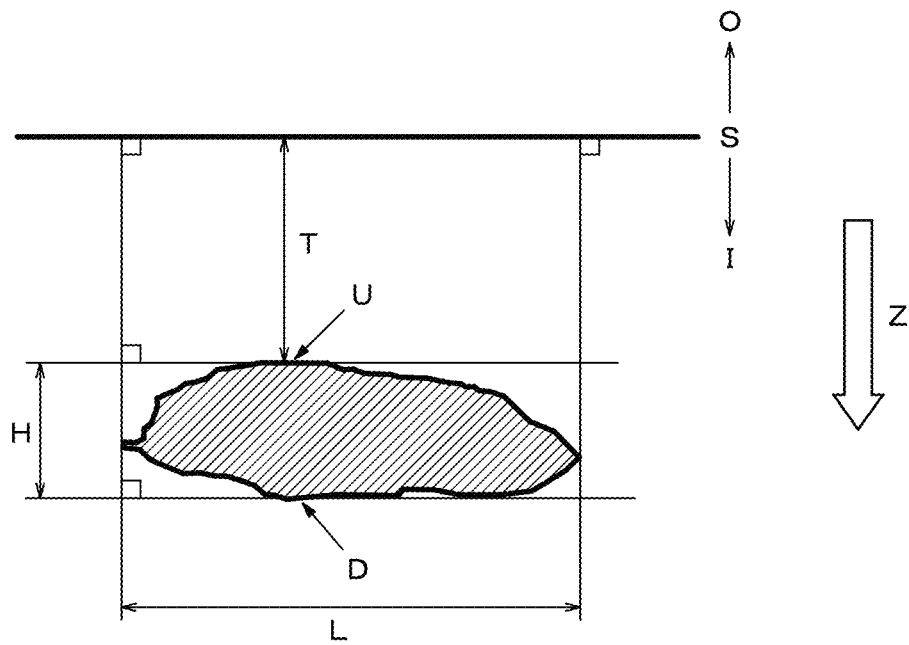
FIG. 2 is an example of a drawing illustrating H/L of a foam particle forming a foam molded product according to a disclosed embodiment.
Figure 3:
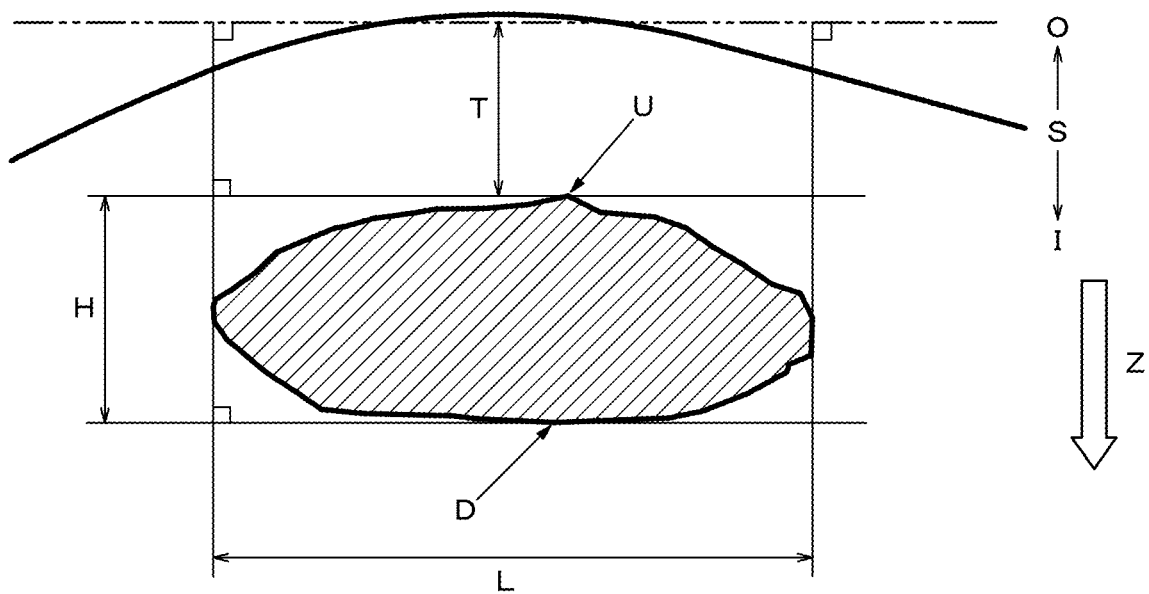
FIG. 3 is an example of a drawing illustrating H/L of a foam particle forming a foam molded product according to a disclosed embodiment.

As illustrated in the schematic view of FIG. 2, a foam particle that, when viewed in an inward I direction from an arbitrary point at the surface S of the foam molded product, was a first foam particle for which a foam form was observed inside a bead shape (hereinafter, also referred to as a "first bead") was identified, and a rectangle surrounding the first bead was prepared through two straight lines in the compression direction of the bead and two straight lines in a perpendicular direction relative to the compression direction. With respect to this rectangle, points where the two straight lines in the perpendicular direction relative to the compression direction were in contact with the first bead were taken to be a bead top point (foam particle top point U) and a bead bottom point (foam particle bottom point D), respectively. The distance from the top point of the first bead to the surface S was measured parallel to the compression direction in the same manner for 30 points, and the arithmetic mean of these measurements was taken to be the surface layer thickness.

(2) Measurement of H/L of Compressive Deformation Layer

A cross-section of a foam molded product was observed using a length measurement function of analysis software accompanying a VHX-2000 microscope. The top and bottom of each of a plurality of beads were determined in the same way as in the method by which (1) surface layer thickness was determined, the distance between two points at which the bead and a normal direction inward I from the surface S were in contact was taken to be the bead width (L), the distance between the top and the bottom of the bead was taken to be (H), and H/L was calculated. Beads for which H/L was 0.5 or less were judged to be compression deformed beads.

(3) Measurement of Compressive Deformation Layer Thickness

The thickness of a compressive deformation layer was calculated as the arithmetic mean for 30 points of the distance between the top point of a first bead such as described above and the bottom point of a lowermost bead for which H/L was 0.5 or less, as viewed from the surface.

(4) Closed Cell Ratio of Foam Molded Product

The closed cell ratio S (%) was calculated by a formula expressed by the following formula (1).

$$S(\%) = \{(Vx - W/\rho)/(Va - W/\rho)\} \times 100 \quad (1)$$

In the formula, Vx is the true volume (cm$^3$) of a foam molded product, Va is the apparent volume (cm$^3$) of the foam molded product, W is the weight (g) of the foam molded product, and p is the density (g/cm$^3$) of a base material resin of the foam molded product. The apparent volume is the volume calculated from the external dimensions of the foam molded product and the true volume is the actual volume of the foam molded product excluding voids.

The true volume of the foam molded product was obtained through measurement using a pycnometer.

(5) Expansion Ratio of Foam Particles Forming Foam Layer

The expansion ratio of foam particles forming a foam layer of a foam molded product was calculated by observing the foam molded product (final product) in a cross-section direction, cutting out a section defined as a foam layer, and then dividing the density (g/cm$^3$) of the base material resin by the apparent density (g/cm$^3$) of the foam layer section. The apparent density of a foam layer section can be measured in accordance with JIS K7222:2005.

The expansion ratio of foam particles forming a foam layer of a foam molded product may be calculated by dividing the density (g/cm$^3$) of the base material resin by the apparent density (g/cm$^3$) of a foam product prior to compression molding (also referred to as a "resin foam product").

Moreover, the expansion ratio of subsequently described pre-expanded particles was calculated by dividing the apparent density of the pre-expanded particles by the density of the base material resin.

(5) Mold Followability of Foam Molded Product

A surface layer side of a foam molded product was visually evaluated so as to evaluate mold followability in accordance with the following standard.

Good: Defects are not observed and a molded product surface that is an inverted shape of a mold is formed Poor: Defects are not observed but surface undulations differing from the mold surface are observed Very poor: Depressed defects such as holes are observed (6) Image Clarity of Foam Molded Product The image clarity of a design surface of a foam molded product was evaluated using an image clarity meter (ICM-1T produced by Suga Test Instruments Co., Ltd.).

Image clarity was evaluated by the following formula.

$$C(n) = (M-m)/(M+m) \times 100$$

Note that n is the slit width, M is the amount of transmitted light for a light receiving-side slit, and m is the amount of leaked light for a light receiving-side slit shielding section.

The image clarity of the design surface of the foam molded product was evaluated with a light receiving-side slit width of 0.125 mm.

A larger value for image clarity (%) signifies better image clarity. For example, in the case of an optical mirror with which perfect image clarity is obtained, the image clarity is 100% because light is completely shielded at the light receiving-side slit and the amount of leaked light m is 0.

(7) Durometer Hardness

In measurement of durometer hardness, a durometer (for example, a DUROMETER HARDNESS TYPE A (product name) produced by Asker) was used to measure the durometer hardness of a foam layer in accordance with JIS K7215 as a value measured within 1 second from pressure application by a load of 1 kgf. Moreover, the durometer hardness of the foam layer was measured at 30 locations and the arithmetic mean of the measurements was taken to be the durometer hardness of the foam layer.

The durometer hardness of a surface layer was taken to be a value measured within 1 second from pressure application by a load of 1 kgf from the surface side. Moreover, the durometer hardness of the surface layer was measured at 30 locations and the arithmetic mean of the measurements was taken to be the durometer hardness of the surface layer.

(8) Flexural Modulus

Measurement of the flexural modulus of a foam molded product was performed in accordance with JIS K7171 (2008). The foam molded product was dried in advance in a vacuum at 40° C. for at least 24 hours, and then the flexural modulus (MPa) thereof was measured using an AUTO-GRAPH (AG-5000D) produced by Shimadzu Corporation by applying a load from the surface layer side.

A flexural modulus of more than 130 MPa was evaluated as excellent rigidity, a flexural modulus of not less than 100 MPa and not more than 130 MPa was evaluated as good rigidity, and a flexural modulus of less than 100 MPa was evaluated as poor rigidity. A larger value for the flexural modulus signifies better rigidity.

The following describes examples and comparative examples for the production method according to the first embodiment.

[Resin Foam Product Production Examples 1 and 2 (A-1 and A-2)]

Pellets having a solid bead shape were obtained by loading 60 mass % of polyphenylene ether resin (PPE) (product name: XYRON TYPE S201A; produced by Asahi Kasei Corporation; surface tension at 20° C.: 40 mN/m) and 40 mass % of general-purpose polystyrene resin (PS) (product name: GP685; produced by PS Japan Corporation) into an extruder, and pelletizing strands ejected from a heated melt-kneading extrusion die using a pelletizer. The pellets had a surface tension of 37 mN/m and a glass-transition temperature Tg of 150° C. In accordance with a method described in Example 1 of JP H4-372630 A, the pellets were housed in a pressure-resistant vessel as a base material resin, gas inside the vessel was purged with dry air, carbon dioxide (gas) was injected as a foaming agent, the pellets serving as a base material resin were impregnated with 7 mass % of carbon dioxide over 3 hours under conditions of a pressure of 3.2 MPa and a temperature of 11° C., and then the base material resin pellets were caused to foam through pressurized steam under stirring by an impeller inside a foaming furnace. Pre-expanded particles A-1 had an expansion ratio of 4.3 times, whereas pre-expanded particles A-2 had an expansion ratio of 8.7 times.

The obtained pre-expanded particles were transferred to a pressure-resistant vessel, the internal pressure was raised to 0.5 MPa over 1 hour with compressed air, and then the internal pressure was held at 0.5 MPa for 8 hours to perform pressure treatment. The resultant particles were loaded into a steam hole-containing mold of an in-mold foam shaping device, the pre-expanded particles were caused to expand and fuse to one another under heating by 0.37 MPa pressurized steam, cooling was subsequently performed, and the resultant product was removed from the mold. In this manner, a resin foam product A-1 (expansion ratio: 5.0 times; thickness: 25 mm) and a resin foam product A-2 (expansion ratio: 10.0 times; thickness: 25 mm) were obtained.

The obtained foam product was used to produce a foam molded product through compression molding using an apparatus including a normal pressing mechanism and also a heat and cool mold mechanism that included a heating and cooling mechanism and enabled efficient preliminary heating of the foam product prior to pressurizing compression, such as disclosed in JP 2015-112827 A.

Note that a hydraulic cylinder compression mechanism or a servomotor compression mechanism was used as a compression mechanism of the apparatus.

Example 1

The resin foam product A-1 was set in a mold having a heating mechanism in advance and preliminary heating thereof was performed in a state with the foam product in contact with an upper mold and a lower mold. In this heating, the temperature of the upper mold, which was at a side where a design surface was to be formed, was set as 210° C., and the temperature of the lower mold, which was at a side where a design surface was not to be formed, was set as 100° C.

The heating time was set as 30 seconds.

After the heating, the upper mold was compressed by 10 mm through a hydraulic cylinder compression mechanism, cooling was started at the same time as starting compression, and the mold was opened after 90 seconds, once the upper mold temperature reached 100° C., to remove a foam molded product that had been provided with a design surface.

Evaluation results for this foam molded product are shown in Table 1.

Examples 2 to 4

Processing was performed under the same conditions as in Example 1 with the exception that the amount of compression was set as 7.5 mm, 5.0 mm, and 2.5 mm in Examples 2 to 4, respectively. Evaluation results for Examples 2 to 4 are shown in Table 1.

Examples 5 to 8

Processing was performed under the same conditions as in Examples 1 to 4 for Examples 5 to 8, respectively, with the exception that the foam product A-2 was used. Evaluation results are shown in Table 1.

Comparative Example 1

Processing was performed under the same conditions as in Example 4 with the exception that the preliminary heating time by the upper mold was set as 10 seconds. Evaluation results are shown in Table 1.

Comparative Example 2

Processing was performed under the same conditions as in Example 4 with the exception that the amount of compression was set as 0 mm (i.e., compression was not performed). Evaluation results are shown in Table 1.

Example 9

The resin foam product A-1 was set in a mold having a heating mechanism in advance and heating thereof was performed in a state with the foam product in contact with an upper mold and a lower mold. In this heating, the temperature of the upper mold, which was at a side where a design surface was to be formed, was set as 210° C., and the temperature of the lower mold, which was at a side where a design surface was not to be formed, was set as 100° C. The heating time was set as 30 seconds.

After the heating, the upper mold was compressed by 10 mm over 40 seconds by a servomotor compression mechanism through 10 compression cycles in which the upper mold was compressed by 1 mm and was then held for 4 seconds.

Cooling was started at the same time as starting compression, and the mold was opened after 40 seconds, once the mold temperature reached 100° C., to remove a foam molded product that had been provided with a design surface.

Evaluation results are shown in Table 1.

Examples 10 to 12

The resin foam product A-1 was heated by the same procedure as in Example 9, and then the upper mold was compressed by 7.5 mm, 5 mm, or 2.5 mm by a servomotor compression mechanism through 10 compression cycles of holding for 4 seconds that were performed at equal intervals. Cooling was started at the same time as starting compression. The mold was opened after 40 seconds, once the upper mold temperature reached 100° C., to remove a foam molded product that had been provided with a design surface.

Evaluation results are shown in Table 1.

Example 13

The resin foam product A-1 was set in a mold having a heating mechanism in advance and heating thereof was performed in a state with the foam product in contact with an upper mold and a lower mold. In this heating, the temperature of the upper mold, which was at a side where a design surface was to be formed, was set as 180° C., and the temperature of the lower mold, which was at a side where a design surface was not to be formed, was set as 100° C. The heating time was set as 30 seconds.

After the heating, the upper mold was compressed by 7.5 mm over 20 seconds by a servomotor compression mechanism through 5 compression cycles in which the upper mold was compressed by 1.5 mm and was then held for 4 seconds.

Cooling was started at the same time as starting compression, and the mold was opened after 20 seconds, once the mold temperature reached 100° C., to remove a foam molded product that had been provided with a design surface.

Results are shown in Table 1.

Example 14

The resin foam product A-1 was set in a mold having a heating mechanism in advance and heating thereof was performed in a state with the foam product in contact with an upper mold and a lower mold. In this heating, the temperature of the upper mold, which was at a side where a design surface was to be formed, was set as 210° C., and the temperature of the lower mold, which was at a side where a design surface was not to be formed, was set as 100° C. The heating time was set as 60 seconds.

After the heating, the upper mold was compressed by 10 mm over 40 seconds by a servomotor compression mechanism through 10 compression cycles in which the upper mold was compressed by 1 mm and was then held for 4 seconds.

Cooling was started at the same time as starting compression, and the mold was opened after 40 seconds, once the mold temperature reached 100° C., to remove a foam molded product that had been provided with a design surface.

Results are shown in Table 1.

Example 15

The resin foam product A-1 was set in a mold having a heating mechanism in advance and heating thereof was performed in a state with the foam product in contact with an upper mold and a lower mold. In this heating, the temperature of the upper mold, which was at a side where a design surface was to be formed, was set as 210° C., and the temperature of the lower mold, which was at a side where a design surface was not to be formed, was set as 100° C. The heating time was set as 60 seconds.

After the heating, the upper mold was compressed by 7.5 mm over 40 seconds by a servomotor compression mechanism through 10 compression cycles in which the upper mold was compressed by 0.75 mm and was then held for 4 seconds.

Cooling was started at the same time as starting compression, and the mold was opened after 40 seconds, once the mold temperature reached 100° C., to remove a foam molded product that had been provided with a design surface.

Evaluation results are shown in Table 1.

Comparative Example 3

The resin foam product A-1 was set in a mold having a heating mechanism in advance and heating thereof was performed in a state with the foam product in contact with an upper mold and a lower mold. In this heating, the temperature of the upper mold, which was at a side where a design surface was to be formed, was set as 210° C., and the temperature of the lower mold, which was at a side where a design surface was not to be formed, was set as 100° C. The heating time was set as 90 seconds.

After the heating, the upper mold was compressed by 7.5 mm over 40 seconds by a servomotor compression mechanism through 10 compression cycles in which the upper mold was compressed by 0.75 mm and was then held for 4 seconds.

Cooling was started at the same time as starting compression, and the mold was opened after 40 seconds, once the mold temperature reached 100° C., to remove a foam molded product that had been provided with a design surface.

Results are shown in Table 1.

[Resin Foam Product Production Example 3 (A-3)]

Polyamide 666 resin (2430A produced by DSM; surface tension at 20° C.: 46 mN/m; denoted as "PA 666" in the tables) with 0.8% talc was melted using an extruder and then strands ejected from a die were pelletized by a pelletizer to obtain solid bead shaped pellets having an average particle diameter of 1.4 mm. The pellets had a surface tension of 46 mN/m and a melting point of 193° C. The obtained pellets were loaded into a 10° C. pressure vessel, 4 MPa carbon dioxide gas was blow in, and absorption thereof by the pellets was carried out for 3 hours. Next, the carbon dioxide gas-impregnated pellets were transferred to a foaming device and 240° C. air was blown in for 20 seconds to obtain an assembly of polyamide pre-expanded particles. The obtained polyamide pre-expanded particles had an expansion ratio of 4.2 times and an average particle diameter of 2.0 mm.

The obtained pre-expanded particles were sealed in an autoclave, compressed air was introduced into the autoclave over 1 hour until the internal pressure of the autoclave reached 0.4 MPa, and then the pressure was held at 0.4 MPa for 24 hours to perform pressure treatment of the pre-expanded particles.

The pre-expanded particles that had undergone pressure treatment were loaded into a cavity of an in-mold shaping mold (cavity dimensions: 300 mm (length), 300 mm (width), 25 mm (height)), and the mold was subsequently clamped. The mold was installed in an in-mold foam shaping machine.

Thereafter, 105° C. saturated steam was supplied into the cavity for 10 seconds, 116° C. saturated steam was subsequently supplied into the cavity for 30 seconds, and the pre-expanded particles were caused to undergo foaming and thermal fusion to shape the pre-expanded particles into a foam product. Cooling water was supplied into the cavity of the mold to cool the obtained foam product, and then the mold was opened to remove a resin foam product A-3. The resin foam product A-3 had an expansion ratio of 5.0 times.

Example 16

The resin foam product A-3 was set in a mold having a heating mechanism in advance and heating thereof was performed in a state with the foam product in contact with an upper mold and a lower mold. In this heating, the temperature of the upper mold, which was at a side where a design surface was to be formed, was set as 210° C., and the temperature of the lower mold, which was at a side where a design surface was not to be formed, was set as 100° C. The heating time was set as 30 seconds.

After the heating, the upper mold was compressed by 10 mm over 40 seconds by a servomotor compression mechanism through 10 compression cycles in which the upper mold was compressed by 1 mm and was then held for 4 seconds.

Cooling was started at the same time as starting compression, and the mold was opened after 40 seconds, once the mold temperature reached 100° C., to remove a foam molded product that had been provided with a design surface.

Results are shown in Table 2.

Examples 17 to 19

The resin foam product A-3 was heated by the same procedure as in Example 16, and then the upper mold was compressed by 7.5 mm, 5.0 mm, or 2.5 mm through 10 compression cycles by a servomotor compression mechanism. Cooling was started at the same time as starting compression, and the mold was opened after 40 seconds, once the mold temperature reached 100° C., to remove a foam molded product that had been provided with a design surface.

Results are shown in Table 2.

Comparative Example 4

The resin foam product A-3 was set in a mold having a heating mechanism in advance and heating thereof was performed in a state with the foam product in contact with an upper mold and a lower mold. In this heating, the temperature of the upper mold, which was at a side where a design surface was to be formed, was set as 210° C., and the temperature of the lower mold, which was at a side where a design surface was not to be formed, was set as 100° C. The heating time was set as 60 seconds.

After the heating, the upper mold was compressed by 2.5 mm over 40 seconds by a servomotor compression mechanism through 10 compression cycles in which the upper mold was compressed by 0.25 mm and was then held for 4 seconds.

Cooling was started at the same time as starting compression, and the mold was opened after 40 seconds, once the mold temperature reached 100° C., to remove a foam molded product that had been provided with a design surface.

Results are shown in Table 2.

The following describes Example 20 and Comparative Example 5 for the production method according to the second embodiment.

Example 20

Polyamide 666 resin (2430A produced by DSM; surface tension at 20° C.: 46 mN/m) with 0.8% talc was melted using an extruder and then strands ejected from a die were pelletized by a pelletizer to obtain solid bead shaped pellets having an average particle diameter of 1.4 mm. The pellets had a melting point of 193° C. The obtained pellets were loaded into a 10° C. pressure vessel, 4 MPa carbon dioxide gas was blow in, and absorption thereof by the pellets was carried out for 3 hours. Next, the carbon dioxide gas-impregnated minipellets were transferred to a foaming device and 240° C. air was blown in for 20 seconds to obtain polyamide pre-expanded particles. The obtained polyamide pre-expanded particles had an expansion ratio of 4.2 times and an average particle diameter of 2.0 mm.

The obtained pre-expanded particles were sealed in an autoclave, compressed air was introduced into the autoclave over 1 hour until the internal pressure of the autoclave reached 0.4 MPa, and then the pressure was held at 0.4 MPa for 24 hours to perform pressure treatment of the pre-expanded particles.

The pre-expanded particles that had undergone pressure treatment were loaded into a cavity of an in-mold shaping mold (cavity dimensions: 300 mm (length), 300 mm (width), 25 mm (height)), and the mold was subsequently clamped. The mold was installed in an in-mold foam shaping machine.

Thereafter, 105° C. saturated steam was supplied into the cavity for 10 seconds, 116° C. saturated steam was subsequently supplied into the cavity for 30 seconds, and the pre-expanded particles were caused to undergo foaming and thermal fusion to shape the pre-expanded particles into a foam product.

Thereafter, 200° C. superheated steam was supplied into a core mold, and once the mold temperature reached 210° C. after 10 seconds, this state was maintained for 30 seconds.

Thereafter, the core mold was compressed by 10 mm over 20 seconds by a servomotor compression mechanism attached to the core mold through 5 compression cycles in which the core mold was compressed by 2 mm and was then held for 4 seconds.

The core mold was cooled by cooling water for 20 seconds concurrently to the compressing, and cooling water was supplied into the cavity to cool the obtained molded product for 20 seconds.

Thereafter, the mold was opened to remove a foam molded product A-4. Results are shown in Table 2.

Comparative Example 5

Shaping was performed by the same method as in Example 20 up until a foam product was obtained, the core mold was held in a state at 210° C. for 30 seconds, and then cooling was started without performing compressing. The core mold was cooled by cooling water for 20 seconds, and cooling water was supplied into the cavity to cool the obtained molded product for 20 seconds.

Thereafter, the mold was opened to remove a foam molded product A-5. Results are shown in Table 2.

Example 21

The resin foam product A-1 was set in a mold having a heating mechanism in advance and preliminary heating thereof was performed in a state with the foam product in contact with an upper mold and a lower mold. In this heating, the temperature of the upper mold, which was at a side where a design surface was to be formed, was set as 210° C., and the temperature of the lower mold, which was at a side where a design surface was not to be formed, was set as 100° C.

The heating time was set as 15 seconds.

After the heating, the upper mold was compressed by 7.5 mm by a hydraulic cylinder compression mechanism, cooling was started at the same time as starting compression, and the mold was opened after 90 seconds, once the upper mold temperature reached 100° C., to remove a foam molded product that had been provided with a design surface.

Evaluation results for this foam molded product are shown in Table 2.

Examples 22 and 23

Processing was performed under the same conditions as in Example 21 with the exception that the amount of compression was set as 5.0 mm and 2.5 mm in Examples 22 and 23, respectively. Evaluation results for Examples 22 and 23 are shown in Table 2.

[Resin Foam Product Production Example 4 (B-1)]

Polyamide 666 resin (2430A produced by DSM; surface tension at 20° C.: 46 mN/m; denoted as "PA 666" in the tables) with 0.8% talc was melted using an extruder and then strands ejected from a profile extrusion die were pelletized by a pelletizer to obtain pellets having an average particle diameter of 1.4 mm and having a hollow cross-sectional shape illustrated in FIG. 4C. The pellets had a melting point of 193° C. The obtained pellets were loaded into a 10° C. pressure vessel, 4 MPa carbon dioxide gas was blow in, and absorption thereof by the pellets was carried out for 12 hours. Next, the carbon dioxide gas-impregnated pellets were transferred to a foaming device and 220° C. air was blown in for 20 seconds to obtain an assembly of polyamide pre-expanded particles. The obtained polyamide pre-expanded particles had an expansion ratio of 4.2 times and an average particle diameter of 2.0 mm.

The obtained pre-expanded particles were sealed in an autoclave, compressed air was introduced into the autoclave over 1 hour until the internal pressure of the autoclave reached 0.4 MPa, and then the pressure was held at 0.4 MPa for 24 hours to perform pressure treatment of the pre-expanded particles.

The pre-expanded particles that had undergone pressure treatment were loaded into a cavity of an in-mold shaping mold (cavity dimensions: 300 mm (length), 300 mm (width), 25 mm (height)), and the mold was subsequently clamped. The mold was installed in an in-mold foam shaping machine.

Thereafter, 105° C. saturated steam was supplied into the cavity for 10 seconds, 116° C. saturated steam was subsequently supplied into the cavity for 30 seconds, and the pre-expanded particles were caused to undergo foaming and thermal fusion to shape the pre-expanded particles into a foam product. Cooling water was supplied into the cavity of the mold to cool the obtained foam product, and then the mold was opened to remove a resin foam product B-1. The resin foam product B-1 had an expansion ratio of 5.5 times.

Example 24

The resin foam product B-1 was set in a mold having a heating mechanism in advance and preliminary heating thereof was performed in a state with the foam product in contact with an upper mold and a lower mold. In this heating, the temperature of the upper mold, which was at a side where a surface layer was to be formed, was set as 210° C., and the temperature of the lower mold, which was at a side where a surface layer was not to be formed, was set as 100° C. The heating time was set as 30 seconds.

After the heating, the upper mold was compressed by 7.5 mm through a hydraulic cylinder compression mechanism, cooling was started at the same time as starting compression, and the mold was opened after 90 seconds, once the upper mold temperature reached 100° C., to remove a resin foam molded product.

Evaluation results for this foam molded product are shown in Table 2.

Example 25

In advance, 25 mm of P-BLOCK (produced by JSP; expansion ratio: 15 times) having non-crosslinked foam polypropylene (melting point: 142° C.; surface tension at 20° C.: 25 mN/mm; denoted as "PP" in the tables) as a base material resin was set in a mold having a heating mechanism as a resin foam product, and was heated in a state with the foam product in contact with an upper mold and a lower mold. In this heating, the temperature of the upper mold, which was at a side where a design surface was to be formed, was set as 180° C., and the temperature of the lower mold, which was at a side where a design surface was not to be formed, was set as 70° C. The heating time was set as 30 seconds.

After the heating, the upper mold was compressed by 7.5 mm over 40 seconds by a servomotor compression mechanism through 10 compression cycles in which the upper mold was compressed by 0.75 mm and was then held for 4 seconds.

Cooling was started at the same time as starting compression, and the mold was opened after 40 seconds, once the mold temperature reached 100° C., to remove a foam molded product that had been provided with a design surface.

Evaluation results for this foam molded product are shown in Table 2.

Comparative Example 6

In advance, 25 mm of P-BLOCK (produced by JSP; expansion ratio: 30 times) having non-crosslinked foam polypropylene (melting point: 142° C.; surface tension at 20° C.: 25 mN/mm; denoted as "PP" in the tables) as a base material resin was set in a mold having a heating mechanism as a resin foam product, and was heated in a state with the foam product in contact with an upper mold and a lower mold. In this heating, the temperature of the upper mold, which was at a side where a design surface was to be formed, was set as 180° C., and the temperature of the lower mold, which was at a side where a design surface was not to be formed, was set as 70° C. The heating time was set as 30 seconds.

After the heating, the upper mold was compressed by 7.5 mm over 40 seconds by a servomotor compression mechanism through 10 compression cycles in which the upper mold was compressed by 0.75 mm and was then held for 4 seconds.

Cooling was started at the same time as starting compression, and the mold was opened after 40 seconds, once the mold temperature reached 100° C., to remove a foam molded product that had been provided with a design surface.

Evaluation results for this foam molded product are shown in Table 2.

Comparative Example 7

The resin foam product A-1 was set in a mold having a heating mechanism in advance and preliminary heating thereof was performed in a state with the foam product in contact with an upper mold and a lower mold. In this heating, the temperature of the upper mold, which was at a side where a design surface was to be formed, was set as 140° C., and the temperature of the lower mold, which was at a side where a design surface was not to be formed, was set as 100° C.

The heating time was set as 30 seconds.

After the heating, the upper mold was compressed by 7.5 mm through a hydraulic cylinder compression mechanism, cooling was started at the same time as starting compression, and the mold was opened after 40 seconds, once the upper mold temperature reached 100° C., to remove a foam molded product.

A surface layer was not formed in the obtained foam molded product because the temperature (140° C.) of the upper mold at the side where a design surface was to be formed was lower than the melting point (142° C.) of the base material resin PP. Therefore, surface layer hardness, design surface mold followability, and design surface image clarity were measured and evaluated by considering the surface of a compressive deformation layer to be the upper surface of a surface layer. Evaluation results for this foam molded product are shown in Table 2.

TABLE 1

|  |  | Example 1 | Example 2 | Example 3 | Example 4 | Example 5 | Example 6 |
|---|---|---|---|---|---|---|---|
| Resin | Resin type | PPE-PS | PPE-PS | PPE-PS | PPE-PS | PPE-PS | PPE-PS |
|  | Surface tension at 20° C. (mN/m) | 37 | 37 | 37 | 37 | 37 | 37 |
|  | Tg or Tm (° C.) | Tg: 150 | Tg: 150 | Tg: 150 | Tg: 150 | Tg: 150 | Tg: 150 |
| Production method | Foam product | A-1 | A-1 | A-1 | A-1 | A-2 | A-2 |
|  | Expansion ratio of foam particles | 5.0 | 5.0 | 5.0 | 5.0 | 10.0 | 10.0 |
|  | Embodiment | First | First | First | First | First | First |
| Compression molding | (Preliminary) heating — Upper mold temperature (° C.) | 210 | 210 | 210 | 210 | 210 | 210 |
|  | Lower mold temperature (° C.) | 100 | 100 | 100 | 100 | 100 | 100 |
|  | Heating time (s) | 30 | 30 | 30 | 30 | 30 | 30 |
|  | Compression — Compression time (s) | 1 ≥ | 1 ≥ | 1 ≥ | 1 ≥ | 1 ≥ | 1 ≥ |
|  | Compression mechanism | Hydraulic cylinder | Hydraulic cylinder | Hydraulic cylinder | Hydraulic cylinder | Hydraulic cylinder | Hydraulic cylinder |
|  | Amount of compression (mm) | 10.0 | 7.5 | 5.0 | 2.5 | 10.0 | 7.5 |
|  | Cooling — Cooling start time | Compression start time | Compression start time | Compression start time | Compression start time | Compression start time | Compression start time |
| Surface layer | Thickness (mm) | 0.25 | 0.25 | 0.25 | 0.25 | 0.15 | 0.15 |
|  | Hardness (HDA) | >90 | >90 | >90 | >90 | >90 | >90 |
| Compressive deformation layer | Thickness (mm) | 2.9 | 1.5 | 1.2 | 0.7 | 3.0 | 1.7 |
|  | Average H/L | 0.35 | 0.31 | 0.38 | 0.44 | 0.30 | 0.34 |
| Foam layer | Thickness (mm) | 11.85 | 15.75 | 18.55 | 21.55 | 11.85 | 15.65 |
|  | Average H/L | 0.91 | 0.92 | 0.93 | 0.91 | 0.91 | 0.90 |
|  | Hardness (HDA) | 67 | 67 | 67 | 67 | 62 | 62 |
| Foam molded product | Closed cell ratio (%) | 92 | 92 | 92 | 92 | 89 | 89 |
|  | Design surface mold followability | Good | Good | Good | Good | Good | Good |
|  | Design surface image clarity (%) | 85 | 71 | 57 | 42 | 56 | 43 |
|  | Rigidity | Excellent | Excellent | Excellent | Excellent | Good | Good |

|  |  | Example 7 | Example 8 | Comparative Example 1 | Comparative Example 2 | Example 9 | Example 10 |
|---|---|---|---|---|---|---|---|
| Resin | Resin type | PPE-PS | PPE-PS | PPE-PS | PPE-PS | PPE-PS | PPE-PS |
|  | Surface tension at 20° C. (mN/m) | 37 | 37 | 37 | 37 | 37 | 37 |
|  | Tg or Tm (° C.) | Tg: 150 | Tg: 150 | Tg: 150 | Tg: 150 | Tg: 150 | Tg: 150 |
| Production method | Foam product | A-2 | A-2 | A-1 | A-1 | A-1 | A-1 |
|  | Expansion ratio of foam particles | 10.0 | 10.0 | 5.0 | 5.0 | 5.0 | 5.0 |
|  | Embodiment | First | First | First | First | First | First |
| Compression molding | (Preliminary) heating — Upper mold temperature (° C.) | 210 | 210 | 210 | 210 | 210 | 210 |
|  | Lower mold temperature (° C.) | 100 | 100 | 100 | 100 | 100 | 100 |
|  | Heating time (s) | 30 | 30 | 10 | 30 | 30 | 30 |
|  | Compression — Compression time (s) | 1 ≥ | 1 ≥ | 1 ≥ | 0 | 40 | 40 |
|  | Compression mechanism | Hydraulic cylinder | Hydraulic cylinder | Hydraulic cylinder | Hydraulic cylinder | Servomotor | Servomotor |
|  | Amount of compression (mm) | 5.0 | 2.5 | 2.5 | 0 | 10.0 | 7.5 |
|  | Cooling — Cooling start time | Compression start time | Compression start time | Compression start time | Compression start time | Compression start time | Compression start time |
| Surface layer | Thickness (mm) | 0.15 | 0.15 | 0.15 | 0.10 | 0.25 | 0.25 |
|  | Hardness (HDA) | >90 | >90 | >90 | >90 | >90 | >90 |
| Compressive deformation layer | Thickness (mm) | 1.4 | 1.0 | 0 | 0 | 3.5 | 2.7 |
|  | Average H/L | 0.28 | 0.40 | — | — | 0.32 | 0.41 |
| Foam layer | Thickness (mm) | 18.45 | 21.35 | 22.35 | 24.00 | 11.25 | 14.55 |
|  | Average H/L | 0.94 | 0.85 | 0.82 | 0.82 | 0.97 | 0.98 |
|  | Hardness (HDA) | 62 | 62 | 67 | 67 | 67 | 67 |
| Foam molded product | Closed cell ratio (%) | 89 | 89 | 92 | 92 | 92 | 92 |

TABLE 1-continued

|  |  | | | | | | |
|---|---|---|---|---|---|---|---|
|  | Design surface mold followability | Good | Good | Very poor | Poor | Good | Good |
|  | Design surface image clarity (%) | 38 | 34 | 15 | 5 | 89 | 85 |
|  | Rigidity | Good | Good | Poor | Poor | Excellent | Excellent |

|  |  | Example 11 | Example 12 | Example 13 | Example 14 | Example 15 | Comparative Example 3 |
|---|---|---|---|---|---|---|---|
| Resin | Resin type | PPE-PS | PPE-PS | PPE-PS | PPE-PS | PPE-PS | PPE-PS |
|  | Surface tension at 20° C. (mN/m) | 37 | 37 | 37 | 37 | 37 | 37 |
|  | Tg or Tm (° C.) | Tg: 150 | Tg: 150 | Tg: 150 | Tg: 150 | Tg: 150 | Tg: 150 |
| Production method | Foam product | A-1 | A-1 | A-1 | A-1 | A-1 | A-1 |
|  | Expansion ratio of foam particles | 5.0 | 5.0 | 5.0 | 5.0 | 5.0 | 5.0 |
|  | Embodiment | First | First | First | First | First | First |
| Compression molding (Preliminary) heating | Upper mold temperature (° C.) | 210 | 210 | 180 | 210 | 210 | 210 |
|  | Lower mold temperature (° C.) | 100 | 100 | 100 | 100 | 100 | 100 |
|  | Heating time (s) | 30 | 30 | 30 | 60 | 60 | 90 |
| Compression | Compression time (s) | 40 | 40 | 20 | 40 | 40 | 40 |
|  | Compression mechanism | Servomotor | Servomotor | Servomotor | Servomotor | Servomotor | Servomotor |
|  | Amount of compression (mm) | 5.0 | 2.5 | 7.5 | 10.0 | 7.5 | 7.5 |
| Cooling | Cooling start time | Compression start time | Compression start time | Compression start time | Compression start time | Compression start time | Compression start time |
| Surface layer | Thickness (mm) | 0.25 | 0.25 | 0.10 | 0.50 | 0.50 | 0.70 |
|  | Hardness (HDA) | >90 | >90 | >90 | >90 | >90 | >90 |
| Compressive deformation layer | Thickness (mm) | 2.0 | 1.5 | 1.5 | 0.7 | 0.5 | 0 |
|  | Average H/L | 0.38 | 0.31 | 0.46 | 0.44 | 0.45 | — |
| Foam layer | Thickness (mm) | 17.75 | 20.75 | 15.90 | 13.75 | 16.50 | 16.80 |
|  | Average H/L | 0.94 | 0.98 | 0.97 | 0.85 | 0.80 | 0.75 |
|  | Hardness (HDA) | 67 | 67 | 67 | 67 | 67 | 67 |
| Foam molded product | Closed cell ratio (%) | 92 | 92 | 92 | 92 | 92 | 92 |
|  | Design surface mold followability | Good | Good | Good | Good | Good | Poor |
|  | Design surface image clarity (%) | 82 | 75 | 85 | 45 | 25 | 15 |
|  | Rigidity | Excellent | Excellent | Good | Excellent | Excellent | Excellent |

TABLE 2

|  |  | Example 16 | Example 17 | Example 18 | Example 19 | Comparative Example 4 | Example 20 |
|---|---|---|---|---|---|---|---|
| Resin | Resin type | PA 666 | PA 666 | PA 666 | PA 666 | PA 666 | PA 666 |
|  | Surface tension at 20° C. (mN/m) | 46 | 46 | 46 | 46 | 46 | 46 |
|  | Tg or Tm (° C.) | Tm: 193 | Tm: 193 | Tm: 193 | Tm: 193 | Tm: 193 | Tm: 193 |
| Production method | Foam product | A-3 | A-3 | A-3 | A-3 | A-3 | — |
|  | Expansion ratio of foam particles | 5.0 | 5.0 | 5.0 | 5.0 | 5.0 | 5.0 |
|  | Embodiment | First | First | First | First | First | Second |
| Compression molding (Preliminary) heating | Upper mold temperature (° C.) | 210 | 210 | 210 | 210 | 210 | 210 |
|  | Lower mold temperature (° C.) | 100 | 100 | 100 | 100 | 100 | 100 |
|  | Heating time (s) | 30 | 30 | 30 | 30 | 60 | 30 |
| Compression | Compression time (s) | 40 | 40 | 40 | 40 | 40 | 20 |
|  | Compression mechanism | Servomotor | Servomotor | Servomotor | Servomotor | Servomotor | Servomotor |
|  | Amount of compression (mm) | 10.0 | 7.5 | 5.0 | 2.5 | 2.5 | 10.0 |
| Cooling | Cooling start time | Compression start time | Compression start time | Compression start time | Compression start time | Compression start time | Compression start time |
| Surface layer | Thickness (mm) | 0.80 | 0.80 | 0.80 | 0.80 | 2.00 | 0.60 |
|  | Hardness (HDA) | >90 | >90 | >90 | >90 | >90 | >90 |
| Compressive deformation layer | Thickness (mm) | 3.0 | 2.5 | 2.3 | 2.0 | 0 | 1.5 |
|  | Average H/L | 0.36 | 0.35 | 0.38 | 0.42 | — | 0.35 |
| Foam layer | Thickness (mm) | 11.20 | 14.20 | 16.90 | 19.70 | 20.50 | 12.90 |

TABLE 2-continued

|  |  | | | | | | |
|---|---|---|---|---|---|---|---|
| Foam molded product | Average H/L | 0.95 | 0.97 | 0.95 | 0.95 | 0.85 | 0.80 |
|  | Hardness (HDA) | 55 | 55 | 55 | 55 | 55 | 55 |
|  | Closed cell ratio (%) | 82 | 82 | 82 | 82 | 82 | 85 |
|  | Design surface mold followability | Good | Good | Good | Good | Poor | Good |
|  | Design surface image clarity (%) | 88 | 86 | 82 | 82 | 29 | 65 |
|  | Rigidity | Excellent | Excellent | Excellent | Excellent | Excellent | Excellent |

| | | Comparative Example 5 | Example 21 | Example 22 | Example 23 | Example 24 | Example 25 |
|---|---|---|---|---|---|---|---|
| Resin | Resin type | PA 666 | PPE-PS | PPE-PS | PPE-PS | PA 666 | PP |
|  | Surface tension at 20° C. (mN/m) | 46 | 37 | 37 | 37 | 46 | 25 |
|  | Tg or Tm (° C.) | Tm: 193 | Tg: 150 | Tg: 150 | Tg: 150 | Tm: 193 | Tg: 142 |
| Production method | Foam product | — | A-1 | A-1 | A-1 | B-1 | P-BLOCK |
|  | Expansion ratio of foam particles | 5.0 | 5.0 | 5.0 | 5.0 | 5.5 | 15 |
|  | Embodiment | Second | First | First | First | First | First |
| Compression molding | (Preliminary) heating | Upper mold temperature (° C.) | 210 | 210 | 210 | 210 | 210 | 180 |
|  |  | Lower mold temperature (° C.) | 100 | 100 | 100 | 100 | 100 | 70 |
|  |  | Heating time (s) | 30 | 15 | 15 | 15 | 30 | 30 |
|  | Compression | Compression time (s) | 0 | 1 ≥ | 1 ≥ | 1 ≥ | 1 ≥ | 40 |
|  |  | Compression mechanism | Servomotor | Hydraulic cylinder | Hydraulic cylinder | Hydraulic cylinder | Hydraulic cylinder | Servomotor |
|  |  | Amount of compression (mm) | 0 | 7.5 | 5.0 | 2.5 | 7.5 | 7.5 |
|  | Cooling | Cooling start time | Compression start time | Compression start time | Compression start time | Compression start time | Compression start time | Compression start time |
| Surface layer | Thickness (mm) | 0.20 | 0.15 | 0.15 | 0.15 | 0.80 | 0.20 |
|  | Hardness (HDA) | 75 | >90 | >90 | >90 | >90 | >90 |
| Compressive deformation layer | Thickness (mm) | 0 | 1.5 | 1.1 | 0.8 | 2.3 | 0.3 |
|  | Average H/L | — | 0.41 | 0.42 | 0.44 | 0.38 | 0.30 |
| Foam layer | Thickness (mm) | 24.80 | 15.85 | 18.75 | 21.55 | 14.40 | 17.00 |
|  | Average H/L | 0.85 | 0.89 | 0.85 | 0.91 | 0.95 | 0.95 |
|  | Hardness (HDA) | 55 | 67 | 67 | 67 | 55 | 30 |
| Foam molded product | Closed cell ratio (%) | 85 | 92 | 92 | 92 | 82 | 90 |
|  | Design surface mold followability | Very poor | Good | Good | Good | Good | Good |
|  | Design surface image clarity (%) | 5 | 80 | 65 | 55 | 82 | 82 |
|  | Rigidity | Excellent | Good | Good | Good | Excellent | Good |

| | | | Comparative Example 6 | Comparative Example 7 |
|---|---|---|---|---|
| Resin | Resin type | | PP | PPE-PS |
|  | Surface tension at 20° C. (mN/m) | | 25 | 37 |
|  | Tg or Tm (° C.) | | Tm: 142 | Tm: 150 |
| Production method | Foam product | | P-BLOCK | A-1 |
|  | Expansion ratio of foam particles | | 30 | 5.0 |
|  | Embodiment | | First | First |
| Compression molding | (Preliminary) heating | Upper mold temperature (° C.) | 180 | 140 |
|  |  | Lower mold temperature (° C.) | 70 | 100 |
|  |  | Heating time (s) | 30 | 30 |
|  | Compression | Compression time (s) | 40 | 1 ≥ |
|  |  | Compression mechanism | Servomotor | Hydraulic cylinder |
|  |  | Amount of compression (mm) | 7.5 | 7.5 |
|  | Cooling | Cooling start time | Compression start time | Compression start time |
| Surface layer | Thickness (mm) | | 0.10 | — |
|  | Hardness (HDA) | | >90 | 60 |
| Compressive deformation layer | Thickness (mm) | | 0.15 | 1.5 |
|  | Average H/L | | 0.25 | 0.35 |
| Foam layer | Thickness (mm) | | 17.25 | 16.00 |
|  | Average H/L | | 0.95 | 0.85 |
|  | Hardness (HDA) | | 20 | 55 |

TABLE 2-continued

| | | | | |
|---|---|---|---|---|
| Foam molded product | Closed cell ratio (%) | 90 | 92 |
| | Design surface mold followability | Good | Poor |
| | Design surface image clarity (%) | 82 | 5 |
| | Rigidity | Poor | Poor |

INDUSTRIAL APPLICABILITY

The foam molded product according to the present embodiment can be provided as a structural component that simultaneously has design, light weight, and rigidity.

Examples of applications for the foam molded product according to the present embodiment include components for vehicles (automobiles, locomotives, steam locomotives, etc.), aircraft, and the like for which light weight, design, and rigidity are necessary, with use as a cover that covers a component as an interior material being particularly suitable.

The disclosed foam molded product can suitably be used as an insulting material, automotive component (for example, an oil pan, an engine cover, an engine under cover, a cylinder head cover, other cover shaped components, an intake manifold, an integrated component thereof, a body structure, a duct, an electrical equipment case, or a battery case), or the like used under high-temperature conditions, such as to exploit the features of the disclosed foam molded product.

REFERENCE SIGNS LIST

1: Surface layer
2: Compressive deformation layer
3: Foam layer
B1: Actual boundary between surface layer and compressive deformation layer
B2: Actual boundary between compressive deformation layer and foam layer
S: Foam molded product surface
O: Outside of foam molded product
I: Inside of foam molded product
T: Surface layer thickness
U: Foam particle top point
D: Foam particle bottom point
H: Length of foam particle in compression direction
L: Length of foam particle in perpendicular direction relative to compression direction
Z: Compression direction

The invention claimed is:

1. A foam molded product containing a resin and comprising a surface layer, a compressive deformation layer, and a foam layer, wherein
   the surface layer has a thickness of 0.1 mm to 5.0 mm,
   the compressive deformation layer is located between the surface layer and the foam layer,
   foam particles forming the compressive deformation layer have an average H/L of 0.5 or less, where H is length in a compression direction and L is length in a perpendicular direction relative to the compression direction,
   foam particles forming the foam layer have an expansion ratio of not less than 3.0 times and less than 30 times, and
   an upper surface of the surface layer has an image clarity of 30% or more.

2. The foam molded product according to claim 1, wherein the surface layer and the foam layer are formed of the same type of resin.

3. The foam molded product according to claim 1, wherein the surface layer is provided with a textured shape.

4. The foam molded product according to claim 1, used as an engine cover or an engine under cover.

5. The foam molded product according to claim 1, wherein the resin is a crystalline resin having a melting point of 145° C. or higher or an amorphous resin having a glass-transition temperature of 145° C. or higher.

6. The foam molded product according to claim 1, wherein the resin is a polyamide.

* * * * *